US012728644B2

(12) United States Patent
Komamiya et al.

(10) Patent No.: US 12,728,644 B2
(45) Date of Patent: Sep. 8, 2026

(54) LIQUID EJECTION HEAD

(71) Applicant: CANON KABUSHIKI KAISHA, Tokyo (JP)

(72) Inventors: Yumi Komamiya, Kanagawa (JP); Shingo Okushima, Kanagawa (JP); Daniel Jan Willem Lindenaar, Maasbree (NL); Peter Joseph Hollands, Baarlo (NL); Clemens Theodorus Weijkamp, Lomm (NL); Roy Josephus Stephanus Derks, Venray (NL); Lambertus M. L. A. van Sas, Helmond (NL)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/604,019

(22) Filed: Mar. 13, 2024

(65) Prior Publication Data

US 2024/0308228 A1 Sep. 19, 2024

(30) Foreign Application Priority Data

Mar. 14, 2023 (JP) ................................ 2023-039661

(51) Int. Cl.
*B41J 2/175* (2006.01)
*B41J 2/045* (2006.01)
(Continued)

(52) U.S. Cl.
CPC ........... *B41J 2/175* (2013.01); *B41J 2/04563* (2013.01); *B41J 2/04581* (2013.01);
(Continued)

(58) Field of Classification Search
CPC .... B41J 2/175; B41J 2/04563; B41J 2/04581; B41J 2/14201; B41J 2/1607; B41J 2/1631;
(Continued)

(56) References Cited

U.S. PATENT DOCUMENTS 8,657,420 B2 2/2014 Hoisington et al.
8,672,463 B2 3/2014 Essen et al.
(Continued)

FOREIGN PATENT DOCUMENTS

CN 103381708 A 11/2013
CN 103635261 A 3/2014
(Continued)

OTHER PUBLICATIONS

Extended European Search Report dated Jul. 17, 2024, in European Patent Application No. 24163234.8.
(Continued)

*Primary Examiner* — Jason S Uhlenhake
*Assistant Examiner* — Alexander D Shenderov
(74) *Attorney, Agent, or Firm* — Venable LLP

(57) ABSTRACT

A liquid ejection head includes multiple ejection ports; multiple pressure chambers; a printing element substrate on which printing elements are arrayed and in which a supply flow channel that extends in a direction in which the multiple pressure chambers are arrayed and that supplies the multiple pressure chambers with a liquid and a collection flow channel that extends in the direction and that collects the liquid from the multiple pressure chambers are provided; and at least two or more bypasses as flow channels that do not pass through the pressure chambers, and in which the at least two or more bypasses include at least one of two or more bypasses for each supply flow channel and two or more bypasses for each collection flow channel.

19 Claims, 14 Drawing Sheets

(51) Int. Cl.

| | |
|---|---|
| ***B41J 2/14*** | (2006.01) |
| ***B41J 2/16*** | (2006.01) |
| ***B41J 2/21*** | (2006.01) |

(52) U.S. Cl.
CPC ......... *B41J 2/14201* (2013.01); *B41J 2/1607* (2013.01); *B41J 2/1631* (2013.01); *B41J 2/2103* (2013.01); *B41J 2002/14306* (2013.01); *B41J 2002/14411* (2013.01)

(58) Field of Classification Search
CPC ............ B41J 2/2103; B41J 2002/14306; B41J 2002/14411; B41J 2/14145; B41J 2/18; B41J 2202/11; B41J 2/1404; B41J 2202/12; B41J 2202/20; B41J 2/14016
USPC ........................................................... 347/17
See application file for complete search history.

(56) References Cited

U.S. PATENT DOCUMENTS

| | | | | |
|---|---|---|---|---|
| 8,807,719 | B2 | 8/2014 | Hoisington et al. | |
| 11,192,363 | B2 | 12/2021 | Ishida et al. | |
| 2007/0120893 | A1* | 5/2007 | Chou | B41J 2/0451 347/61 |
| 2012/0160925 | A1* | 6/2012 | Hoisington | B41J 2/175 239/104 |
| 2013/0233939 | A1* | 9/2013 | Uezawa | B05B 17/0615 239/102.1 |
| 2013/0278677 | A1* | 10/2013 | Vaeth | B41J 2/1628 347/40 |
| 2021/0300038 | A1 | 9/2021 | Morimoto et al. | |
| 2022/0314620 | A1 | 10/2022 | Mori et al. | |

FOREIGN PATENT DOCUMENTS

| | | | |
|---|---|---|---|
| CN | 106956509 | A | 7/2017 |
| CN | 111845079 | A | 10/2020 |
| EP | 4 032 709 | A1 | 7/2022 |
| JP | 2014-237323 | A | 12/2014 |
| WO | 2021/183121 | A1 | 9/2021 |

OTHER PUBLICATIONS

Office Action dated Jul. 25, 2026, in Chinese Patent Application No. 202410270485.X.

* cited by examiner

LIQUID EJECTION HEAD

BACKGROUND

Field

The present disclosure relates to a liquid ejection head.

Description of the Related Art

As a method for an ink jet printing head, there are a so-called thermal method in which a liquid is bubbled by a heating element to be ejected and a so-called piezo method in which a liquid is ejected by deformation of a piezoelectric element. In the former, a temperature variation occurs in a printing element substrate since the heating element is used, and in the latter, a temperature variation in a printing element substrate and between printing element substrates occurs due to heat generation in a control circuit that controls the piezoelectric element. For example, the viscosity of the liquid (ink or the like) to be ejected is changed because of these temperature variations, and thus an ejection amount variation occurs in the printing element substrate. As a result, there is a possibility of causing an image quality deterioration. Additionally, as the temperature rises, a possibility of a change in the properties of the ink such as viscosity becomes high.

As a method to deal with the above-described problem, Japanese Patent Laid-Open No. 2014-237323 discloses a method of controlling the temperature of a printing element substrate by circulating a temperature-controlled liquid so as to pass through a pressure chamber in the printing element substrate and also by circulating the liquid through a bypass not passing through the pressure chamber.

SUMMARY

However, in Japanese Patent Laid-Open No. 2014-237323, although one bypass is provided for one back surface flow channel, there is a great pressure drop in a liquid supply channel and a liquid collection channel having a relatively great flow resistance, and thus a pressure variation between pressure chambers is increased. Therefore, a problem that the temperature variation in the printing element substrate and the subsequent image quality deterioration occur as a result of the pressure distribution occurrence in the back surface flow channel has not been completely solved. Additionally, in the liquid supply channel and the liquid collection channel having a relatively great flow resistance, a sufficient flow rate may not be obtained, and there is a possibility that a temperature control function cannot be sufficiently performed, and this may cause an excessive rise in the ink temperature.

Given the circumstances, in light of the above-mentioned problems, an object of the present disclosure is to suppress a temperature variation in a liquid ejection head including a printing element substrate by suppressing a pressure variation between pressure chambers and to prevent a temperature rise in a liquid.

One aspect of the present invention is directed to a liquid ejection head, including multiple ejection ports; multiple pressure chambers; a printing element substrate on which printing elements are arrayed and in which a supply flow channel that extends in a direction in which the multiple pressure chambers are arrayed and that supplies the multiple pressure chambers with a liquid and a collection flow channel that extends in the direction and that collects the liquid from the multiple pressure chambers are provided; and at least two or more bypasses as flow channels that do not pass through the pressure chambers, in which the at least two or more bypasses include at least one of two or more bypasses for each supply flow channel and two or more bypasses for each collection flow channel.

DESCRIPTION OF THE EMBODIMENTS

Embodiments of the present disclosure are described below with reference to the drawings.

First Embodiment

<Configuration of Printing Apparatus>

Figure 1:
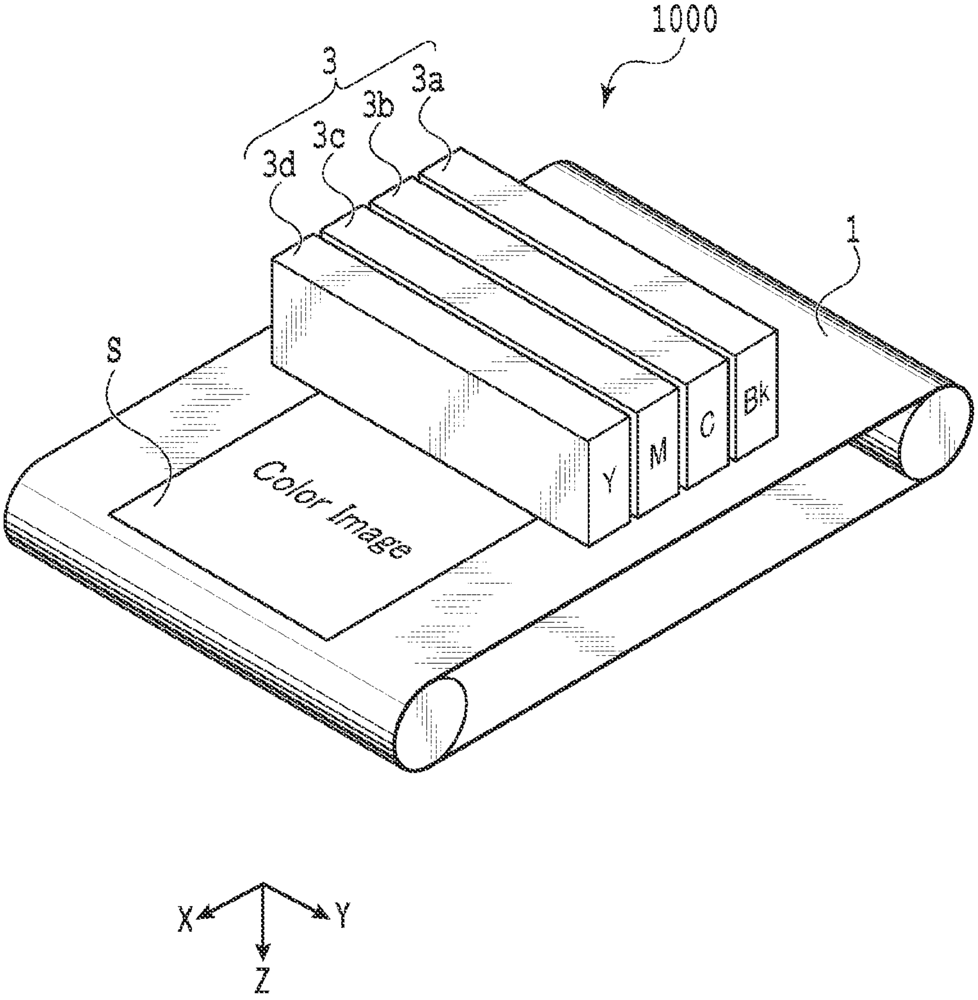
FIG. 1 is a diagram illustrating a schematic configuration of a printing apparatus.

FIG. 1 is a perspective view illustrating a schematic configuration of an overall printing apparatus to which the present embodiment is applicable. The printing apparatus of the present embodiment is an ink jet printing apparatus (hereinafter, simply referred to as a printing apparatus) 1000 that prints a color image on a printing medium S by ejecting inks of cyan (C), magenta (M), yellow (Y), and black (Bk). In FIG. 1, an X direction is a conveyance direction of the printing medium S, a Y direction is a width direction of the printing medium, and a Z direction is a vertical direction (top and bottom direction).

FIG. 1 illustrates the printing apparatus 1000 in a mode in which a liquid ejection head (a so-called printing head) 3 applies ink directly to the printing medium S conveyed in a +X direction. The printing medium S is mounted on a conveyance unit 1 and conveyed in the +X direction at a predetermined speed under four liquid ejection heads 3*a*, 3*b*, 3*c*, and 3*d* that eject different inks. In FIG. 1, the liquid ejection heads 3*a*, 3*b*, 3*c*, and 3*d* are arranged in the +X direction in the order from black, cyan, magenta, and yellow, and the inks are applied to the printing medium S in this order. In each of the liquid ejection heads 3*a*, 3*b*, 3*c*, and 3*d*, multiple ejection ports from which the inks are ejected are arrayed in the Y direction.

Note that, although cut paper is illustrated as the printing medium S in FIG. 1, the printing medium S may be continuous paper supplied from rolled paper or may not be limited to paper and may be a film or the like. Additionally, in a case where it is unnecessary to particularly distinguish the liquid ejection heads 3*a*, 3*b*, 3*c*, and 3*d*, they are collectively called the liquid ejection head 3. The same applies to other constituents.

Figure 2:
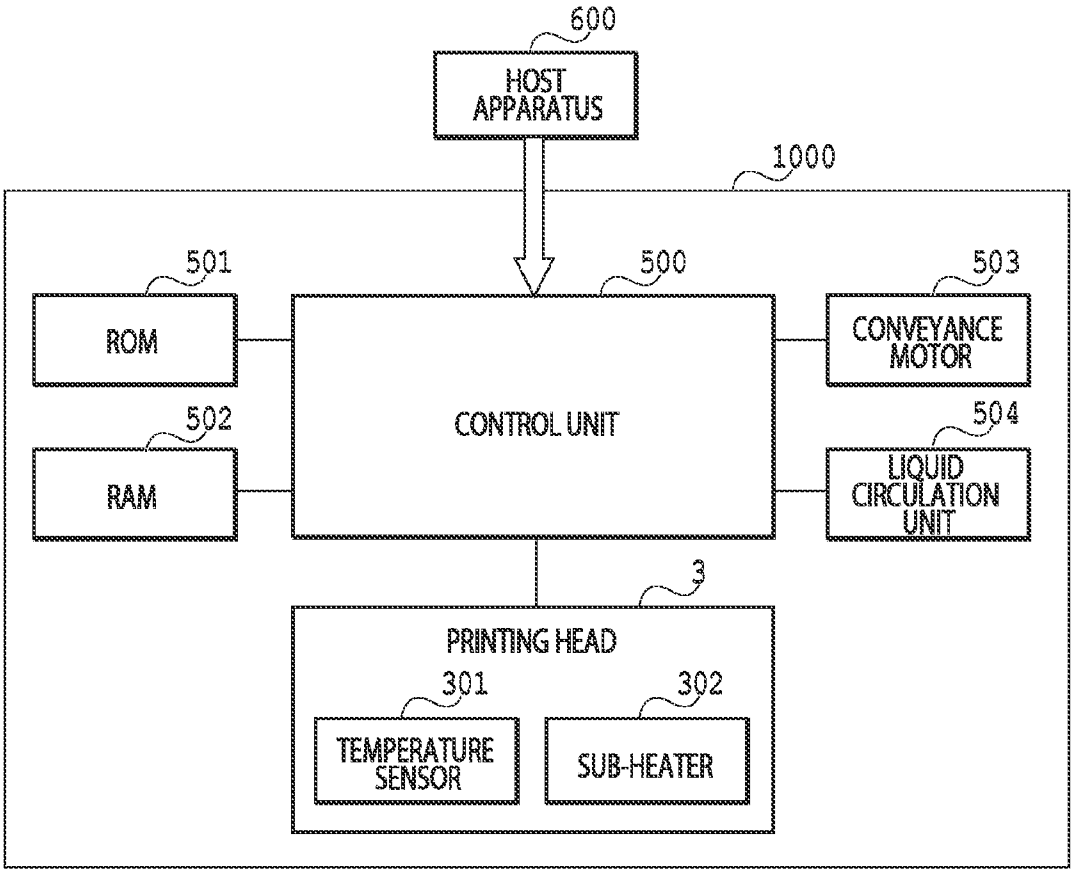
FIG. 2 is a block diagram illustrating a configuration related to control in the printing apparatus.

FIG. 2 is a block diagram describing a configuration related to control in the printing apparatus 1000. A control unit 500 is formed of a CPU and the like and controls the overall printing apparatus 1000 while using a RAM 502 as a working area according to a program and various parameters stored in a ROM 501. The control unit 500 performs predetermined image processing on image data received from an externally connected host apparatus 600 according to the program and parameters stored in the ROM 501 and generates ejection data that the liquid ejection head 3 can eject. The control unit 500 then drives the liquid ejection head 3 according to this ejection data and causes ejection of the ink at a predetermined frequency.

In the middle of the ejection operation by the liquid ejection head 3, the control unit 500 drives a conveyance motor 503 to convey the printing medium S in the +X direction at a speed corresponding to a driving frequency and also drives a liquid circulation unit 504 to cause ejection of a liquid in a circulation path (described later). Thus, an image according to the image data received from the host apparatus 600 is printed on the printing medium S. In the ROM 501, information on a region used in the ejection ports that are used for the ejection in each of the liquid ejection heads 3*a*, 3*b*, 3*c*, and 3*d* is saved to be rewritable for the corresponding one of the liquid ejection heads 3*a*, 3*b*, 3*c*, and 3*d*.

<Circulation Path of Ink>

Figure 3:
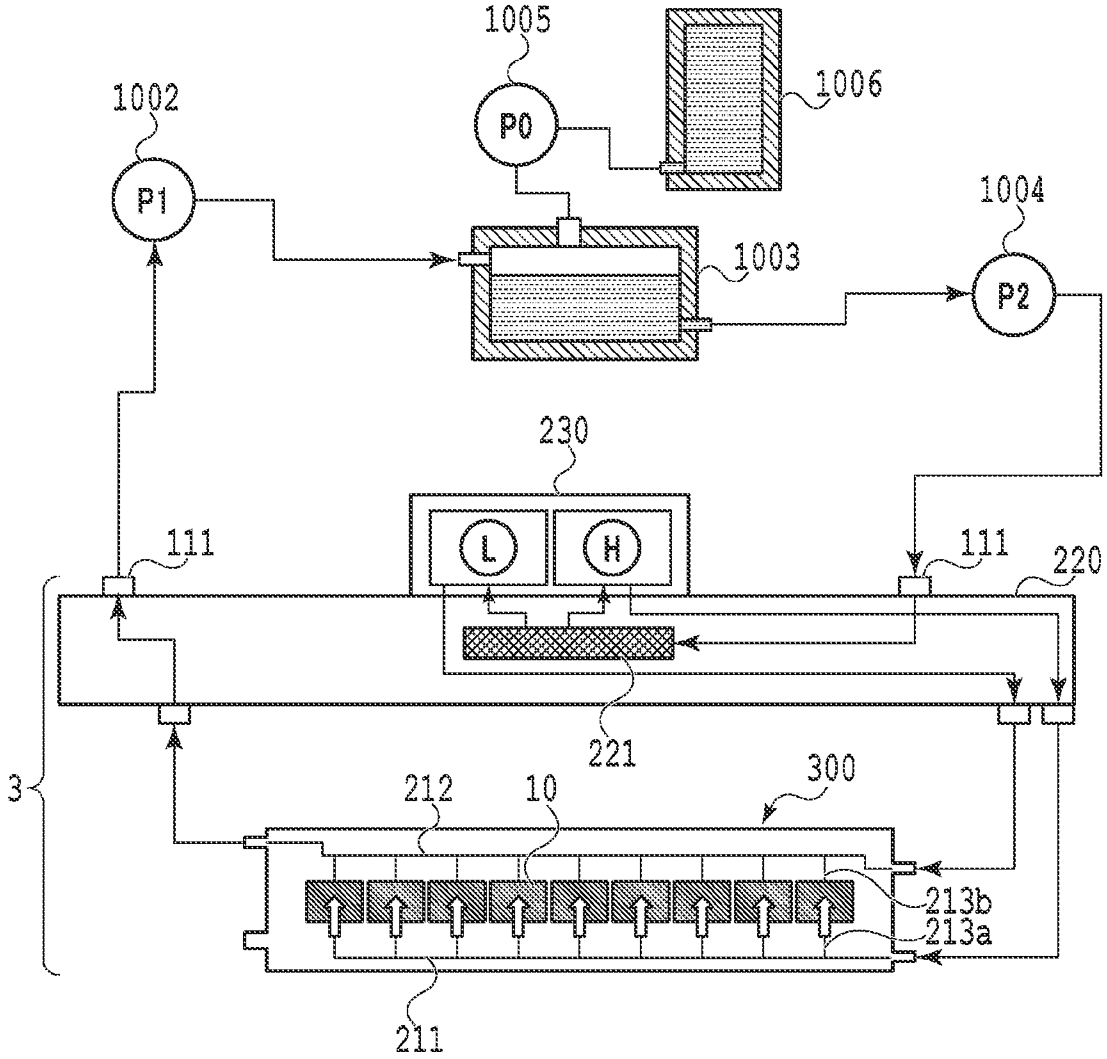
FIG. 3 is a diagram illustrating a circulation path in the printing apparatus.

FIG. 3 is a schematic view illustrating the circulation path applied to the printing apparatus of the present embodiment and is a diagram in which the liquid ejection head 3 is in fluid connection with a first circulation pump 1002, a buffer tank 1003, and the like. Note that, although only a path in which one color of ink out of the CMYK inks is illustrated for the sake of simple description in FIG. 3, in actuality, circulation paths corresponding to the multiple colors are provided in the liquid ejection head 3 and a printing apparatus main body. The buffer tank 1003 as a sub tank that is connected with a main tank 1006 includes an air communication port (not illustrated) that allows for communication between inside and outside of the tank and can discharge an air bubble in the ink to the outside. The buffer tank 1003 is also connected with a replenishing pump 1005. In a case where the ink is consumed by the liquid ejection head 3 with the ejection (discharge) of the ink from the ejection ports of the liquid ejection head such as printing and suction recovery by the ink ejection, the replenishing pump 1005 transfers the consumed amount of ink from the main tank 1006 to the buffer tank 1003.

The first circulation pump 1002 has a role to extract the liquid from a liquid connection unit 111 of the liquid ejection head 3 to flow the liquid to the buffer tank 1003. While the liquid ejection head 3 is driven, the first circulation pump 1002 flows a certain amount of the ink in a common collection flow channel 212.

A negative pressure control unit 230 is provided between paths of a second circulation pump 1004 and a liquid ejection unit 300. The negative pressure control unit 230 has a function to operate to maintain a pressure on a downstream side (that is, a liquid ejection unit 300 side) of the negative pressure control unit 230 to a constant pressure set in advance even in a case where a flow rate of a circulation system is varied due to a difference in Duty to perform printing.

As illustrated in FIG. 3, the negative pressure control unit 230 includes two pressure adjustment mechanisms in which control pressures different from each other are set. In the two negative pressure adjustment mechanisms, a relatively high pressure side (indicated by H in FIG. 3) and a relatively low pressure side (indicated by L in FIG. 3) are connected to a common supply flow channel 211 and a common collection flow channel 212 in the liquid ejection unit 300, respectively, by way of the inside of a liquid supply unit 220. In the liquid ejection unit 300, the common supply flow channel 211, the common collection flow channel 212, and an individual supply flow channel 213*a* and an individual collection flow channel 213*b* communicating with each printing element substrate are provided. Since the individual flow channels 213 communicate with the common supply flow channel 211 and the common collection flow channel 212, a part of the liquid flowed by the second circulation pump 1004 passes through an internal flow channel of a printing element substrate 10 from the common supply flow channel 211 and flows to the common collection flow channel 212 (an arrow in FIG. 3). This is because a pressure difference is provided between the pressure adjustment mechanism H connected to the common supply flow channel 211 and the pressure adjustment mechanism L connected to the common collection flow channel 212, and the first circulation pump 1002 is connected to only the common collection flow channel 212.

Thus, in the liquid ejection unit 300, there are generated a flow of the liquid that passes through the common collection flow channel 212 and a flow of liquid passing through inside of each printing element substrate 10 from the common supply flow channel 211 to reach the common collection flow channel 212. Therefore, it is possible to discharge heat generated in each printing element substrate 10 to the outside of the printing element substrate 10 with the flow from the common supply flow channel 211 to the common collection flow channel 212. Additionally, with such a configuration, it is possible to generate a flow of the ink also in the ejection ports and a pressure chamber in which no printing is being performed while the printing is performed by the liquid ejection head 3; therefore, it is possible to suppress the thickening of the ink in such portions. Moreover, it is possible to discharge the thickened ink and a foreign substance in the ink to the common collection flow channel 212. Therefore, the liquid ejection head 3 of the present example can perform high-speed printing with high image quality.

<Configuration of Printing Head>

Figure 4A:
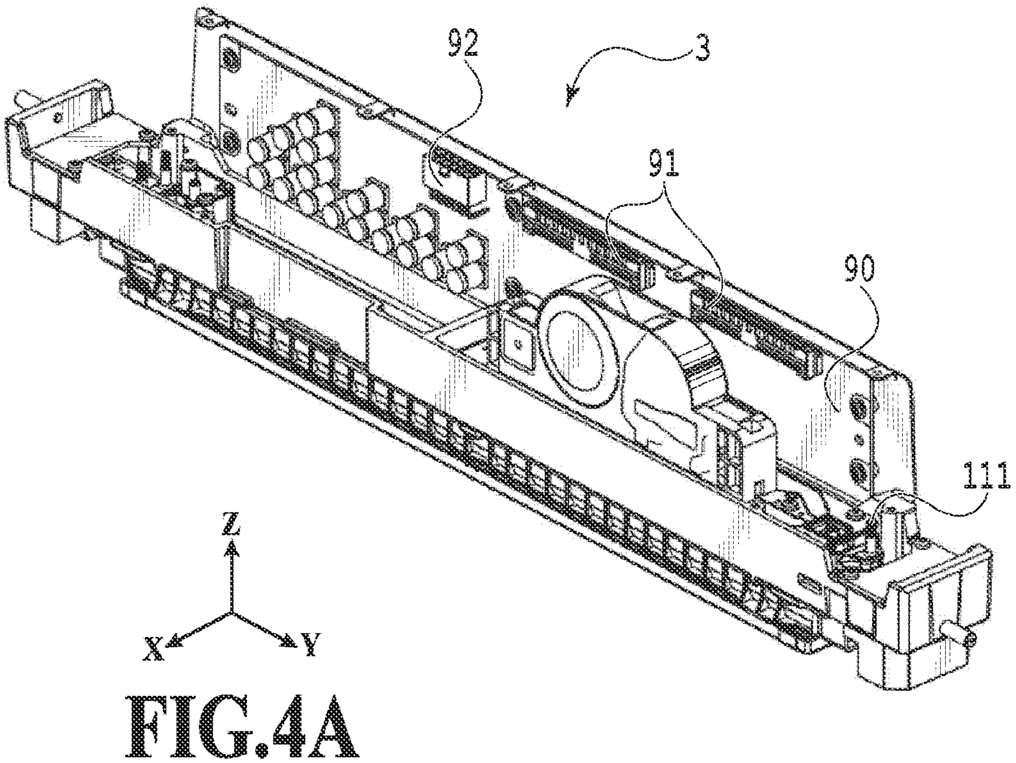
FIGS. 4A and 4B are perspective views of a liquid ejection head.
Figure 4B:
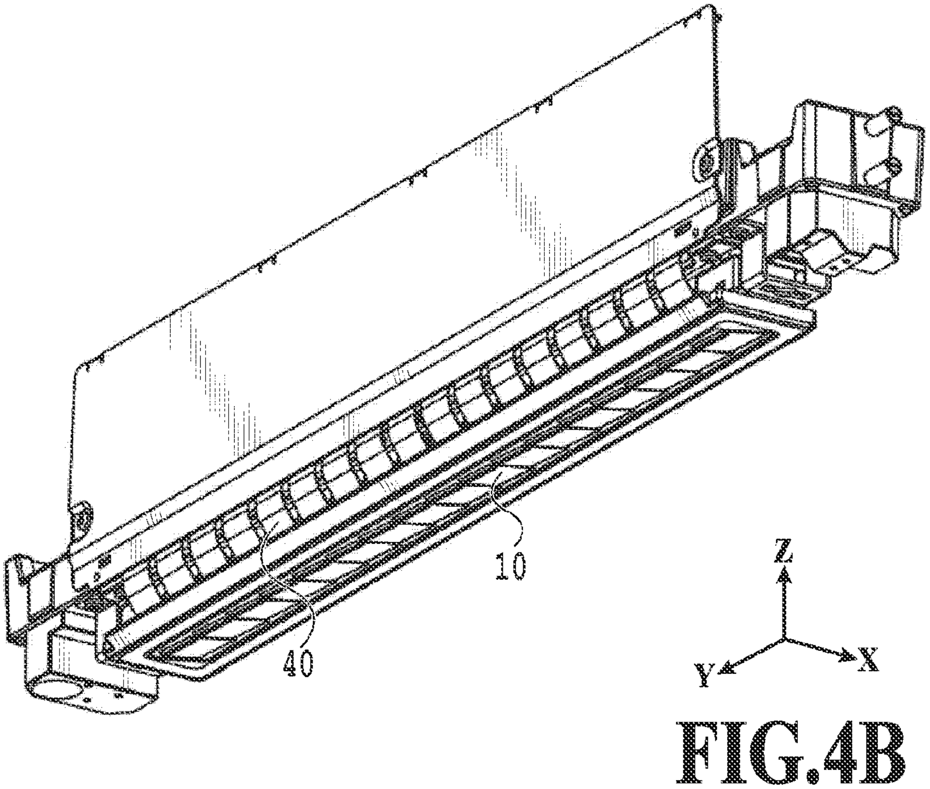

FIGS. 4A and 4B are perspective views of the liquid ejection head 3 according to the present embodiment. The liquid ejection head 3 is a line-type liquid ejection head in which 17 printing element substrates 10 capable of ejecting ink are arrayed linearly (arranged to be in-line). As illustrated in FIG. 4A, the liquid ejection head 3 includes the printing element substrates 10 and a signal input terminal 91 and a power supply terminal 92 electrically connected through a flexible wiring substrate 40 and an electric wiring substrate 90. The signal input terminal 91 and the power supply terminal 92 are electrically connected with the control unit of the printing apparatus 1000 and supply the printing element substrates 10 with an ejection driving signal and the power required for the ejection, respectively. The wirings aggregated by an electric circuit in the electric wiring substrate 90 allow for a smaller number of the signal input terminals 91 and power supply terminals 92 than the number of the printing element substrates 10. Thus, a small number of electric connection units are required to be detached in a case of assembling the liquid ejection head 3 onto or replacing the liquid ejection head from the printing apparatus 1000. As illustrated in FIGS. 4A and 4B, the liquid connection unit 111 provided on one side of the liquid ejection head 3 is connected with a liquid supply system of the printing apparatus 1000. Thus, the ink is supplied from the supply system of the printing apparatus 1000 to the liquid ejection head 3, and additionally the ink that passes through the inside of the liquid ejection head 3 is collected into the supply system of the printing apparatus 1000. Therefore, it is possible to circulate the ink through the path in the printing apparatus 1000 and the path in the liquid ejection head 3.

Figure 5:
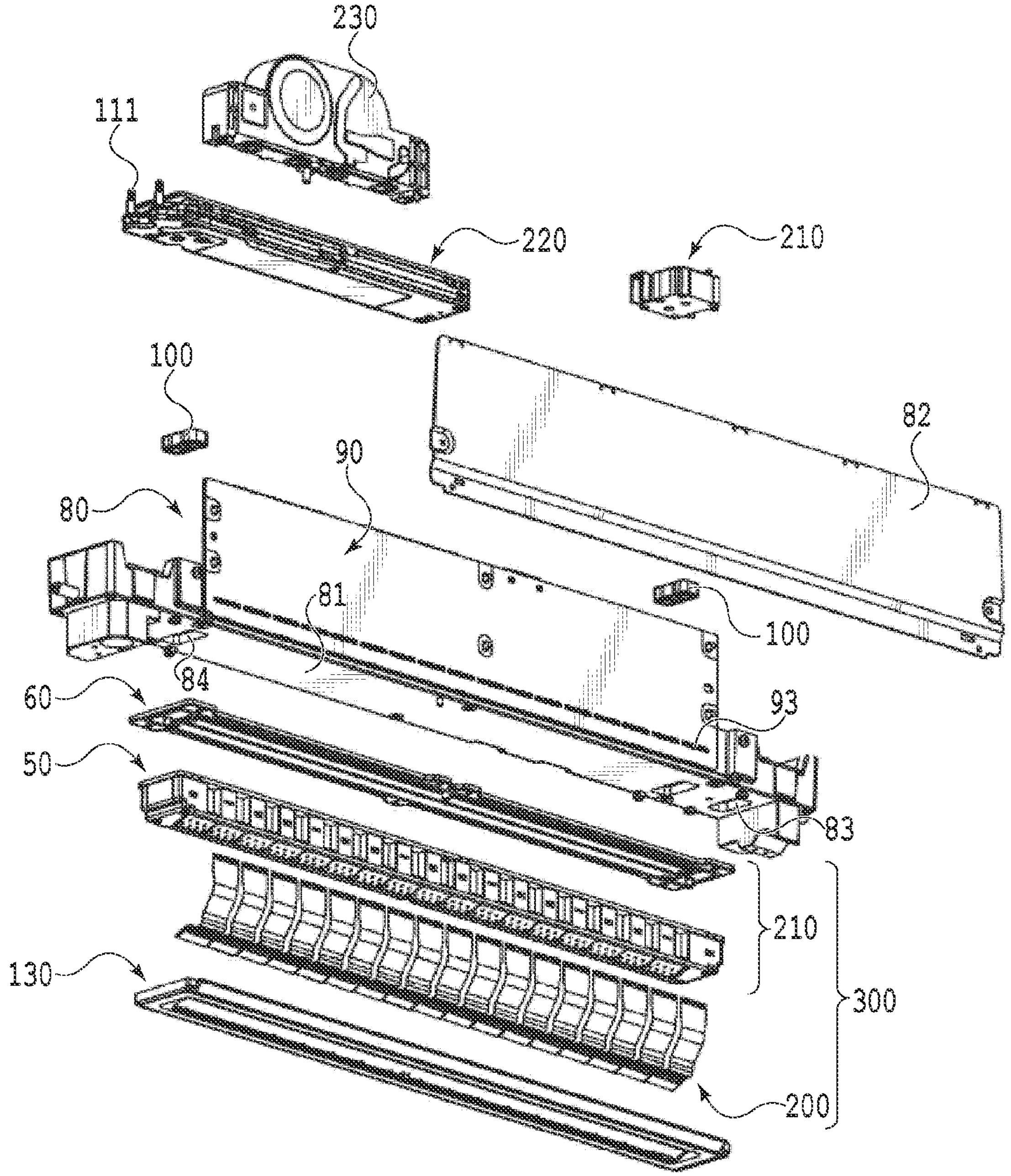
FIG. 5 is an exploded view of the liquid ejection head.

FIG. 5 illustrates an exploded perspective view of the liquid ejection head 3. As illustrated in FIG. 5, the liquid ejection head 3 is formed of parts and units. The liquid ejection unit 300, the liquid supply unit 220, and the electric wiring substrate 90 are attached to a housing 80. The liquid supply unit 220 is provided with the liquid connection unit 111, and a filter 221 (FIG. 3) for each color that communicates with each opening of the liquid connection unit 111 is provided inside the liquid supply unit 220 to remove a foreign substance in the supplied ink. The liquid that passes through the filter 221 is supplied to the negative pressure control unit 230 arranged on the liquid supply unit 220 so as to correspond to each color. The negative pressure control unit 230 is a unit for each color including a pressure adjustment valve. Actions of a valve and a spring member provided inside the negative pressure control unit 230 of each color attenuate significantly a change in a pressure drop in the supply system of the printing apparatus 1000 (the supply system upstream of the liquid ejection head 3) that occurs according to a variation of a flow rate of the liquid. Therefore, it is possible to stabilize a change in a negative pressure downstream (the liquid ejection unit 300 side) of the pressure control unit within a certain range. Two pressure adjustment valves are built-in in the negative pressure control unit 230 of each color and are set to different control pressures, respectively. By way of the liquid supply unit 220, the high pressure side communicates with the common supply flow channel 211 in the liquid ejection unit 300, and the low pressure side communicates with the common collection flow channel 212.

The housing 80 includes a liquid ejection unit support unit 81 and an electric wiring substrate support unit 82 and supports the liquid ejection unit 300 and the electric wiring substrate 90 while securing the rigidity of the liquid ejection head 3. The electric wiring substrate support unit 82 is configured to support the electric wiring substrate 90 and is fixed on the liquid ejection unit support unit 81 by screwing. The liquid ejection unit support unit 81 is provided with openings 83 and 84 into which joint rubber 100 is inserted. The liquid supplied from the liquid supply unit 220 is guided to a second flow channel member 60 forming the liquid ejection unit 300 through the joint rubber 100.

Next, a configuration of a flow channel member 210 included in the liquid ejection unit 300 is described. As illustrated in FIG. 5, the flow channel member 210 is a first flow channel member 50 and the second flow channel member 60 in a laminated form, and multiple ejection modules 200 are bonded on a bonding surface of the first flow channel member 50 with an adhesive (not illustrated). Thus, there is a flow channel configuration in which the liquid supplied from the liquid supply unit 220 is distributed to each ejection module 200, and the liquid recirculated from the ejection module 200 returns to the liquid supply unit 220. The flow channel member 210 is fixed on the liquid ejection unit support unit 81 by screwing. A cover member 130 is attached to a surface on a side of the liquid ejection unit 300 facing the printing medium.

Figures 6A, 6B, 6C, 6D:
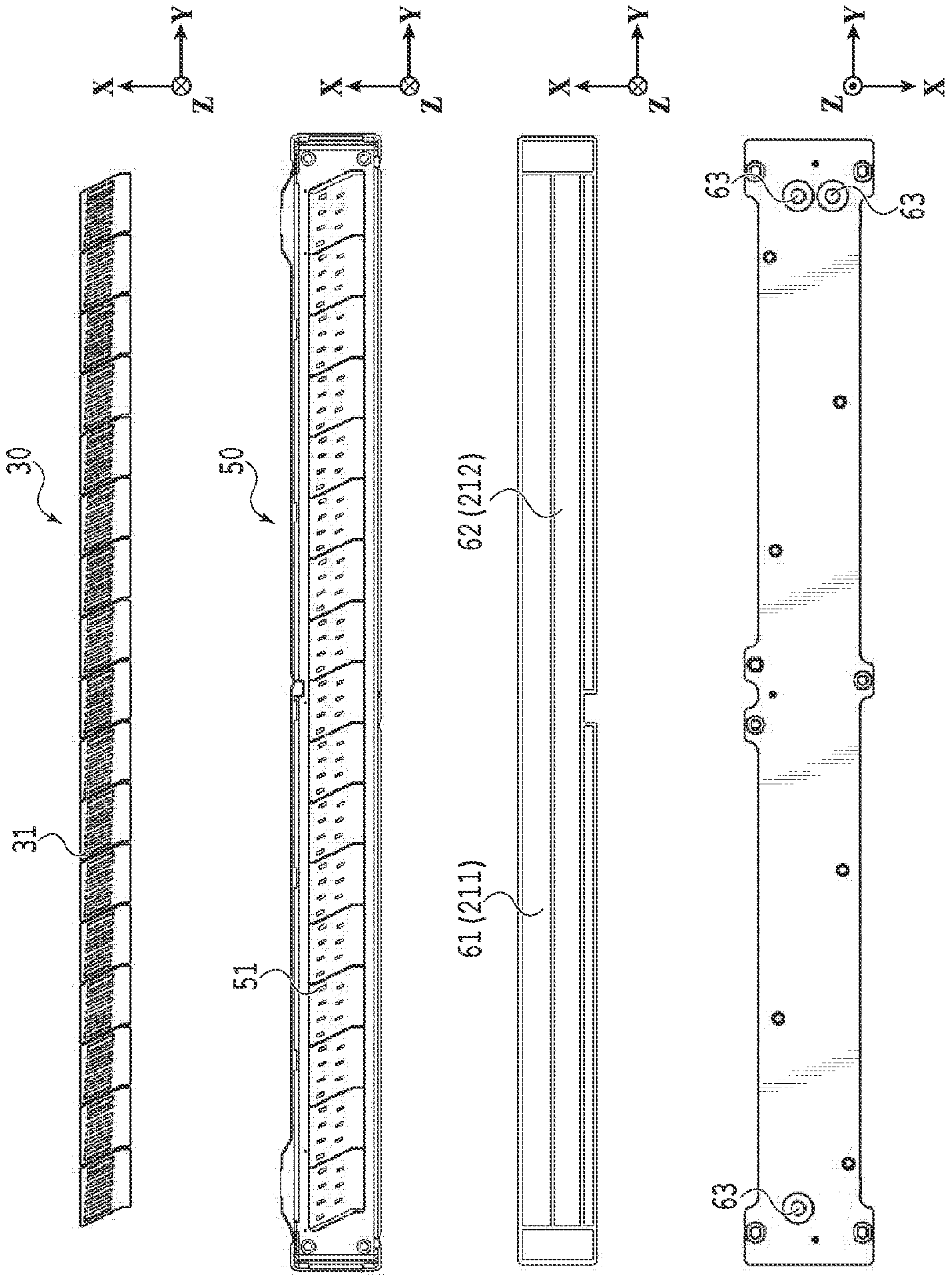
FIGS. 6A to 6D are exploded views of a flow channel member.

FIGS. 6A to 6D are diagrams describing a detailed configuration of the flow channel member 210. FIG. 6A illustrates a surface of a support member 30 that is put in contact with the printing element substrate 10, FIG. 6B illustrates a surface of the first flow channel member 50 that is put in contact with the support member 30, FIG. 6C illustrates a cross-section of a middle layer of the first flow channel member, and FIG. 6D illustrates a surface of the second flow channel member on a liquid ejection unit support unit 81 side, respectively. Note that FIG. 6A to FIG. 6C are diagrams viewed from an ejection port surface, and FIG. 6D is a diagram viewed from the opposite side, which is the liquid ejection unit support unit 81 side. The support member 30 supports the printing element substrate 10 directly (or indirectly).

Multiple support members 30 arrayed in the Y direction are arranged on the first flow channel member 50, and one printing element substrate 10 is arranged for each support member 30. With such a configuration, it is possible to assemble various sizes of the liquid ejection head 3 by adjusting the number of the arrayed ejection modules 200.

As illustrated in FIG. 6A, on the surface of the support member 30 that is put in contact with the printing element substrate 10, a support member communication port 31, which is the individual supply flow channel 213*a* and the individual collection flow channel 213*b* described in FIG. 3, is in fluid connection with the printing element substrate 10. As illustrated in FIG. 6B, the support member communication port 31 is in fluid communication with the common supply flow channel 211 or the common collection flow channel 212 through a communication port 51 formed in the first flow channel member 50. Accordingly, the support member communication port 31 is referred to as a "supply communication port" or a "collection communication port". As illustrated in FIG. 6C, on the middle layer of the first flow channel member 50, common flow channel grooves 61 and 62, which are the common supply flow channel 211 and the common collection flow channel 212 (see FIG. 3) and extend in the Y direction, are formed. As illustrated in FIG. 6D, a common communication port 63 that is in fluid communication with the liquid supply unit 220 is formed at two end portions or one end of the common flow channel grooves 61 and 62.

Figure 7A:
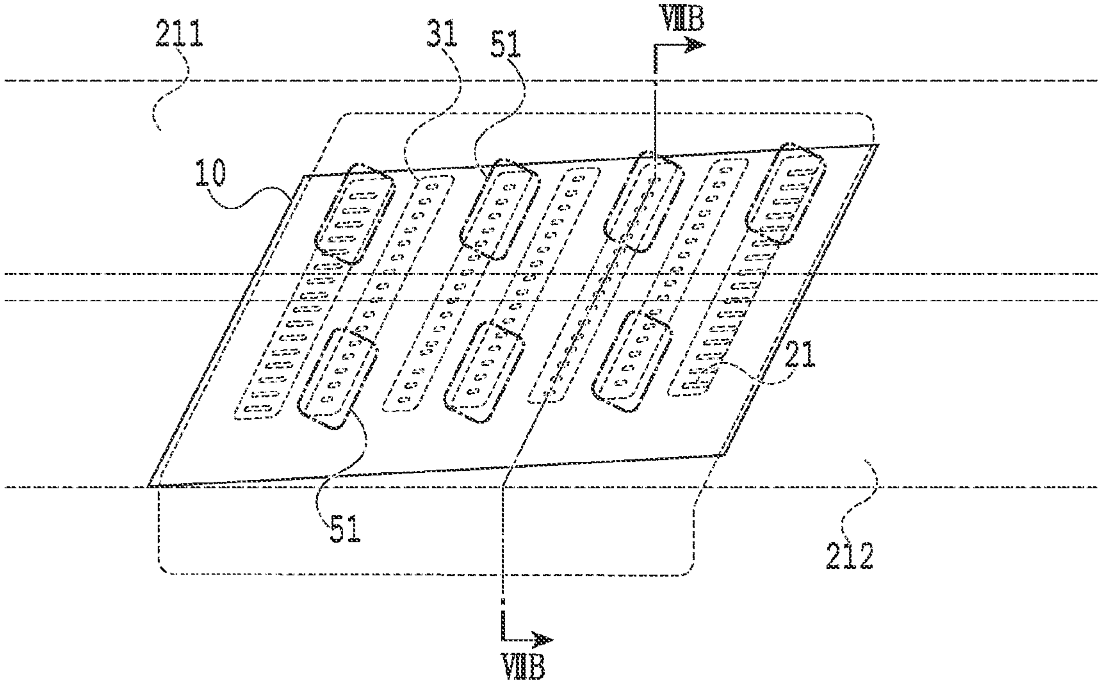
FIGS. 7A and 7B are diagrams describing a flow channel structure formed inside the flow channel member.
Figure 7B:
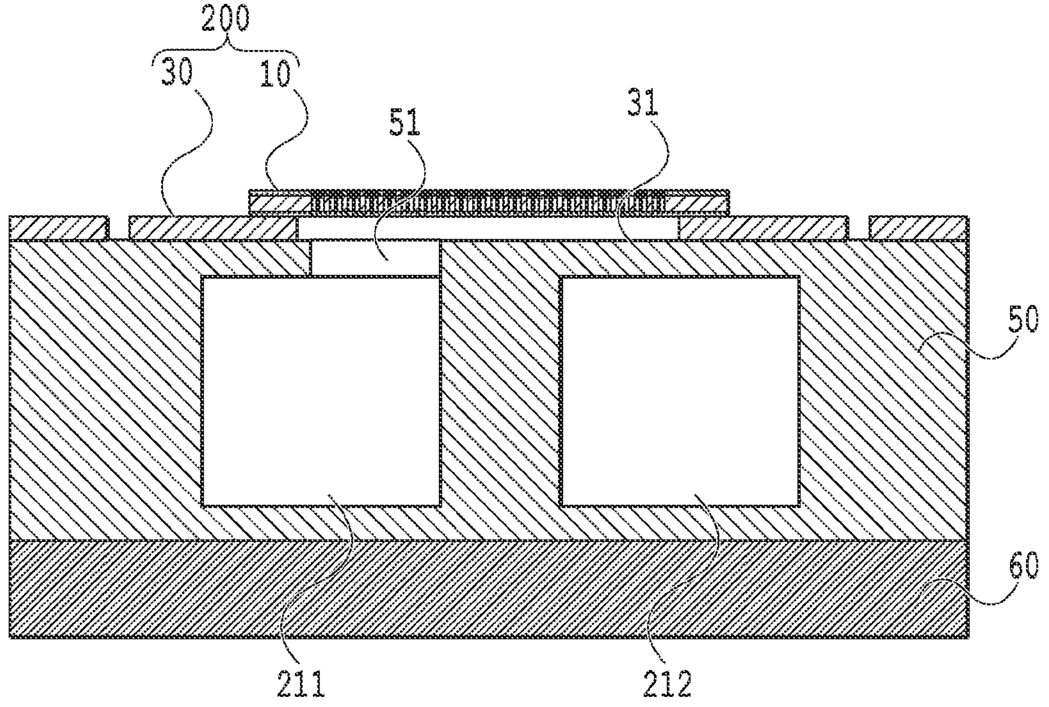

FIGS. 7A and 7B are diagrams describing a flow channel structure formed inside the flow channel member 210, and FIG. 7A is a perspective view while FIG. 7B is a cross-sectional view. FIG. 7A is an enlarged perspective view of the flow channel member 210 viewed from the Z direction, and FIG. 7B is a cross-sectional view taken along a cross-section line VIIB-VIIB in FIG. 7A.

The printing element substrate 10 of the ejection module 200 is placed on the communication port 51 of the first flow channel member 50 with the support member 30 being arranged therebetween. Note that, although the communication port 51 corresponding to the common collection flow channel 212 is not illustrated in FIG. 7B, it can be seen from FIG. 7A that the communication port 51 is illustrated in another cross-section.

As described above, the common supply flow channel 211 is connected to the relatively high pressure side of the negative pressure control unit 230, and the common collection flow channel 212 is connected to the relatively low pressure side of the negative pressure control unit 230. There is formed an ink supply path to supply the ink passing through the common communication port 63 (see FIGS. 6A to 6D), the common supply flow channel 211, and the support member communication port 31 to the inside of a flow channel formed in the printing element substrate 10. Likewise, there is formed an ink collection path from the flow channel in the printing element substrate 10 to the support member communication port 31, the communication port 51, the common collection flow channel 212, and the common communication port 63 (see FIGS. 6A to 6D). While the ink is circulated as described above, in the printing element substrate 10, the ejection operation according to the ejection data is performed, and the ink out of the ink supplied through the ink supply path that is not consumed in the ejection operation is collected through the ink collection path.

<Ejection Module>

Figure 8A:
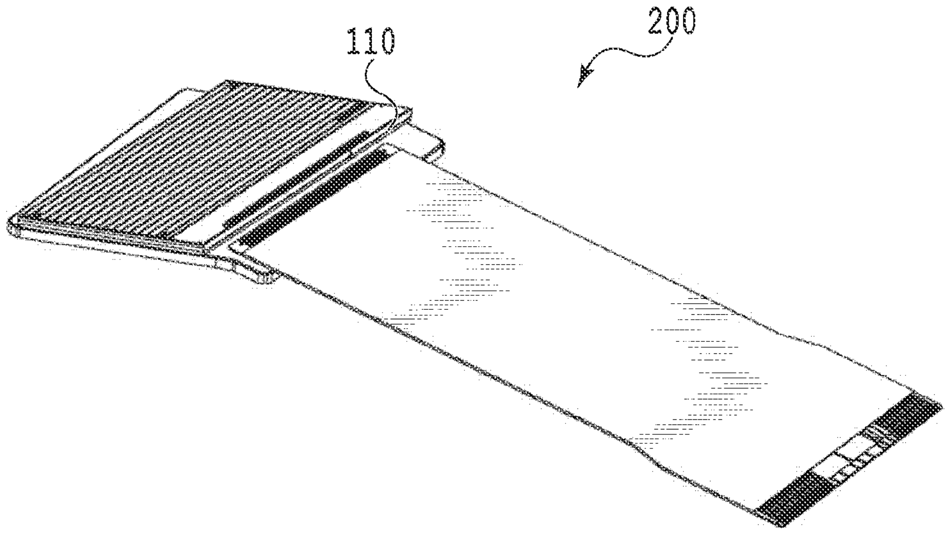
FIGS. 8A and 8B are diagrams illustrating a structure of an ejection module.
Figure 8B:
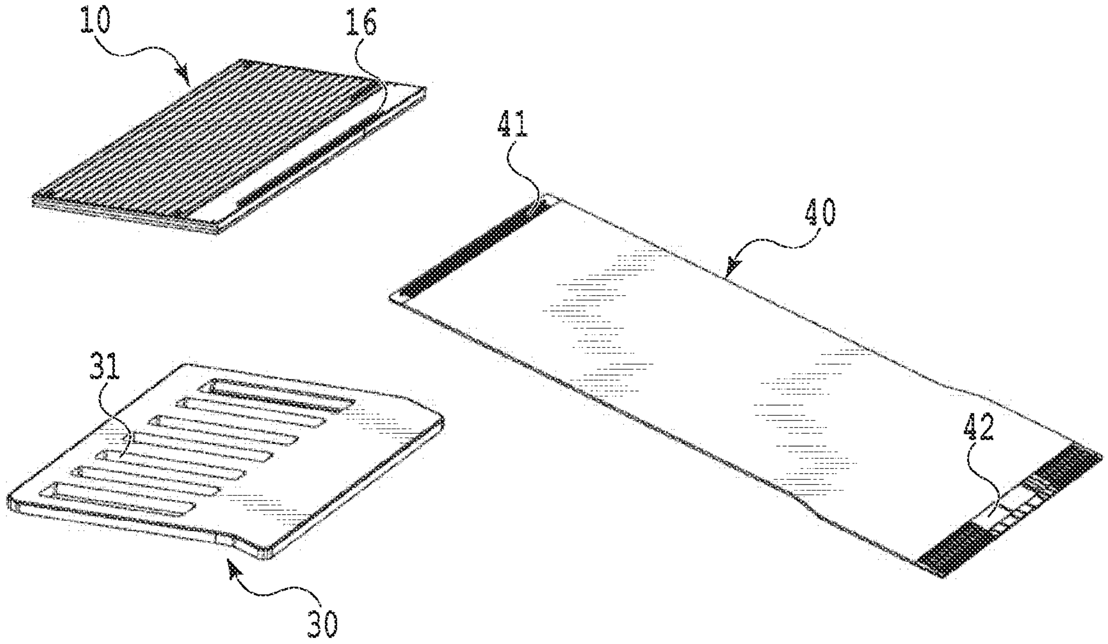

FIG. 8A is a perspective view of one ejection module 200, and FIG. 8B is an exploded view thereof. As a method of manufacturing the ejection module 200, first, the printing element substrate 10 and the flexible wiring substrate 40 are adhered onto the support member 30 in which the support member communication port 31 is provided in advance. Thereafter, a terminal 16 on the printing element substrate 10 and a terminal 41 on the flexible wiring substrate 40 are electrically connected by wire bonding, and thereafter the wire bonding portion (the electric connection portion) is covered with and sealed by a sealing material 110. A terminal 42 of the flexible wiring substrate 40 on the opposite side of the printing element substrate 10 is electrically connected with a connection terminal 93 (see FIG. 5) of the electric wiring substrate 90. The support member 30 is a support that supports the printing element substrate 10 and is also a flow channel member that allows for the fluid communication between the printing element substrate 10 and the flow channel member 210; therefore, it is preferable for the support member 30 to have a high flatness and to be bonded with the printing element substrate with sufficiently high reliability. The material is preferably alumina or a resin material, for example.

<Structure of Printing Element Substrate>

Figure 9A:
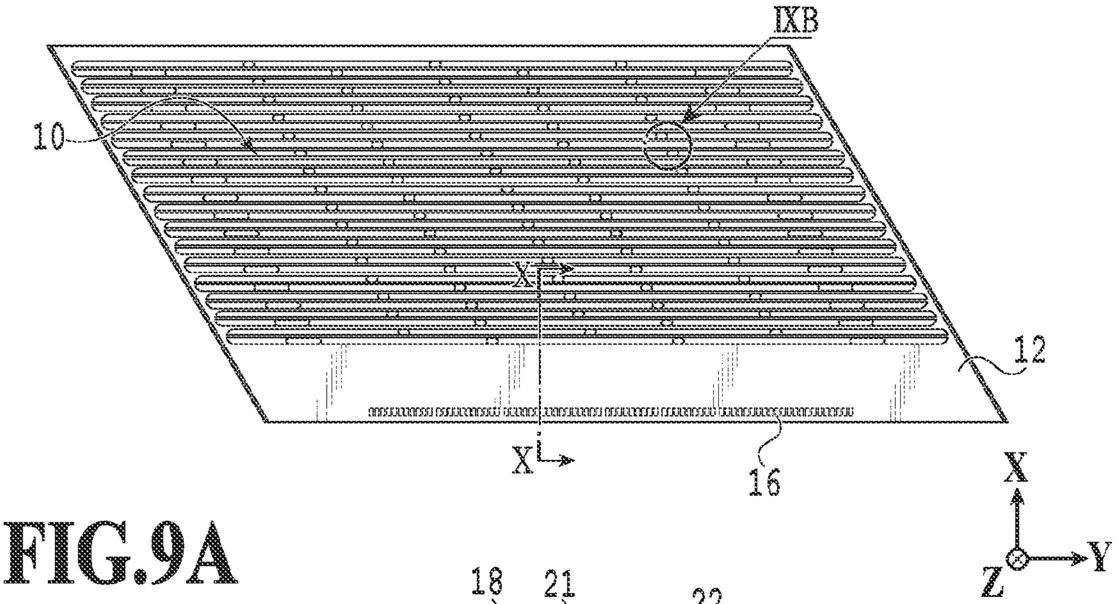
FIGS. 9A to 9C are diagrams illustrating a structure of a printing element substrate.
Figure 9B:
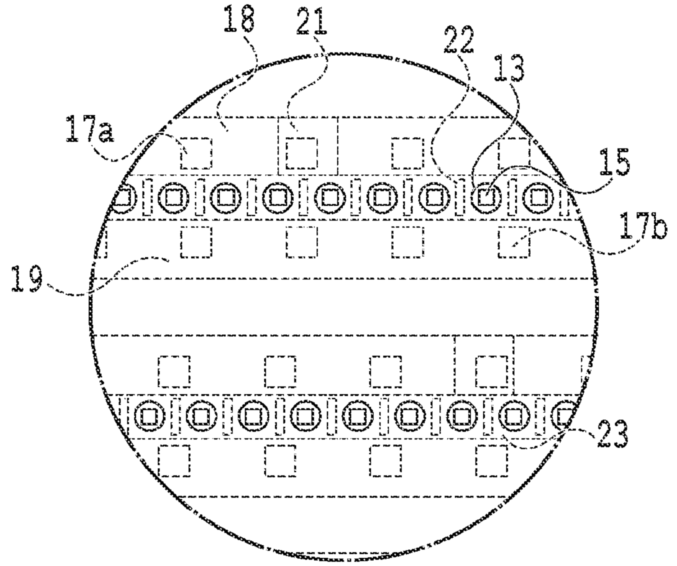
Figure 9C:
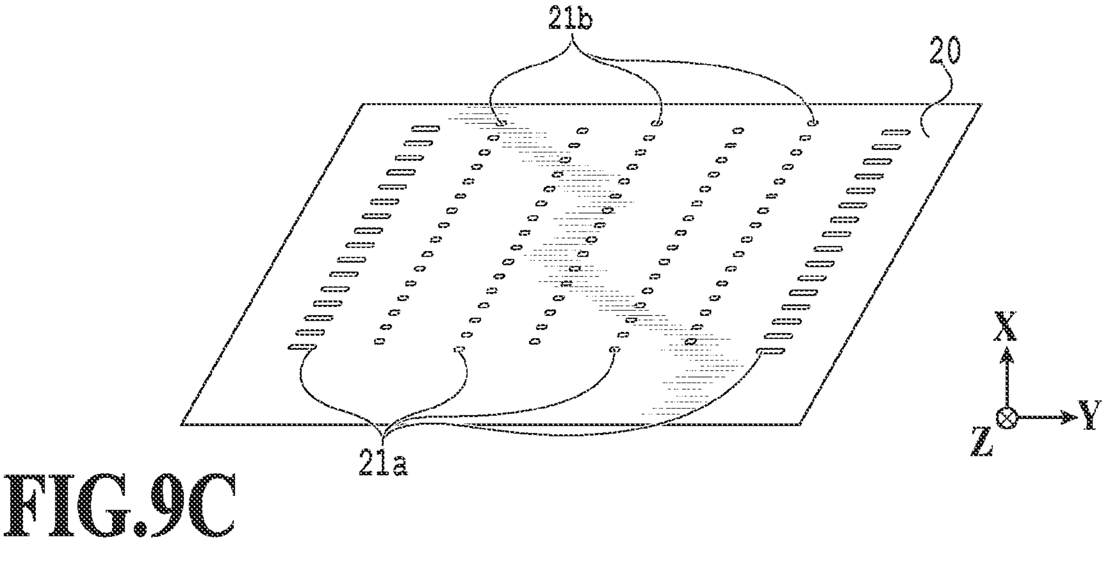

FIG. 9A illustrates a plan view of a surface of a side of the printing element substrate 10 in which an ejection port 13 is formed, FIG. 9B illustrates an enlarged view of a portion indicated by IXB in FIG. 9A, and FIG. 9C illustrates a plan view of a back surface of FIG. 9A. Here is described a configuration of the printing element substrate 10 in the present embodiment. Note that, hereinafter, a direction in which an ejection port array of arrayed multiple ejection ports 13 is referred to as an "ejection port row direction". As illustrated in FIG. 9B, in a position corresponding to each ejection port 13, a printing element 15 that is a heat generation element (referred to as a pressure generation element, a pressure generation mechanism, or the like) to bubble the liquid using heat energy is arranged. A pressure chamber 23 including the printing element 15 therein is partitioned by a partition 22. The printing element 15 is electrically connected with the terminal 16 by an electric wiring (not illustrated) provided to the printing element substrate 10. Additionally, the printing element 15 generates heat based on a pulse signal inputted through the electric wiring substrate 90 (see FIG. 5) and the flexible wiring substrate 40 (see FIGS. 8A and 8B) from a control circuit of the printing apparatus 1000 and boils the liquid. The liquid is ejected from the ejection port 13 by force of bubbling caused by this boiling. As illustrated in FIG. 9B, a liquid supply channel 18 extends on one side while a liquid collection channel 19 extends on the other side along each ejection port row. The liquid supply channel 18 and the liquid collection channel 19 are flow channels provided on the printing element substrate 10 and extending in the ejection port row direction. The liquid supply channel 18 communicates with the ejection port 13 through a supply port 17*a*, and the liquid collection channel 19 communicates with the ejection port 13 through a collection port 17*b*. Note that the liquid supply channel 18 is referred to as an in-substrate supply flow channel, and the liquid collection channel 19 is referred to as an in-substrate collection flow channel. The printing element 15 is a pressure generation mechanism, and it is possible to use a heating element or a piezoelectric element as this pressure generation mechanism. Note that, in a case where the piezoelectric element is used, the printing apparatus 1000 includes an integrated circuit that provides a waveform to the piezoelectric element. This integrated circuit and the printing element substrate 10 are thermally connected with each other, and the heat is conducted between the integrated circuit and the printing element substrate 10.

As illustrated in FIG. 9C, a cover plate 20 in the form of a sheet is laminated on a back surface of the surface of the printing element substrate 10 in which the ejection port 13 is formed, and later-described multiple openings 21 communicating with the liquid supply channel 18 and the liquid collection channel 19 are provided in the cover plate 20. In the present embodiment, the cover plate and the printing element substrate are formed by lamination; however, the cover plate and the printing element substrate may be formed integrally. In the present embodiment, four cover plate supply openings 21*a* for each liquid supply channel 18 and three cover plate collection openings 21*b* for each liquid collection channel 19 are provided in the cover plate 20; however, the number of the openings is not limited thereto. As illustrated in FIG. 9B, each opening 21 in the cover plate 20 communicates with the communication port 51 illustrated in FIG. 7A. It is preferable that the cover plate 20 has sufficient corrosion resistance to the liquid, and additionally, the opening shape and the opening position of the opening 21 are required to be accurate so as to supply the pressure chamber with the ink. Therefore, it is preferable to use a photosensitive resin material and a silicon plate as material of the cover plate 20 and to provide the opening 21 by the photolithography process. It is desirable for the thickness of the cover plate to be around 30 to 600 μm in terms of the strength and workability.

Figure 10:
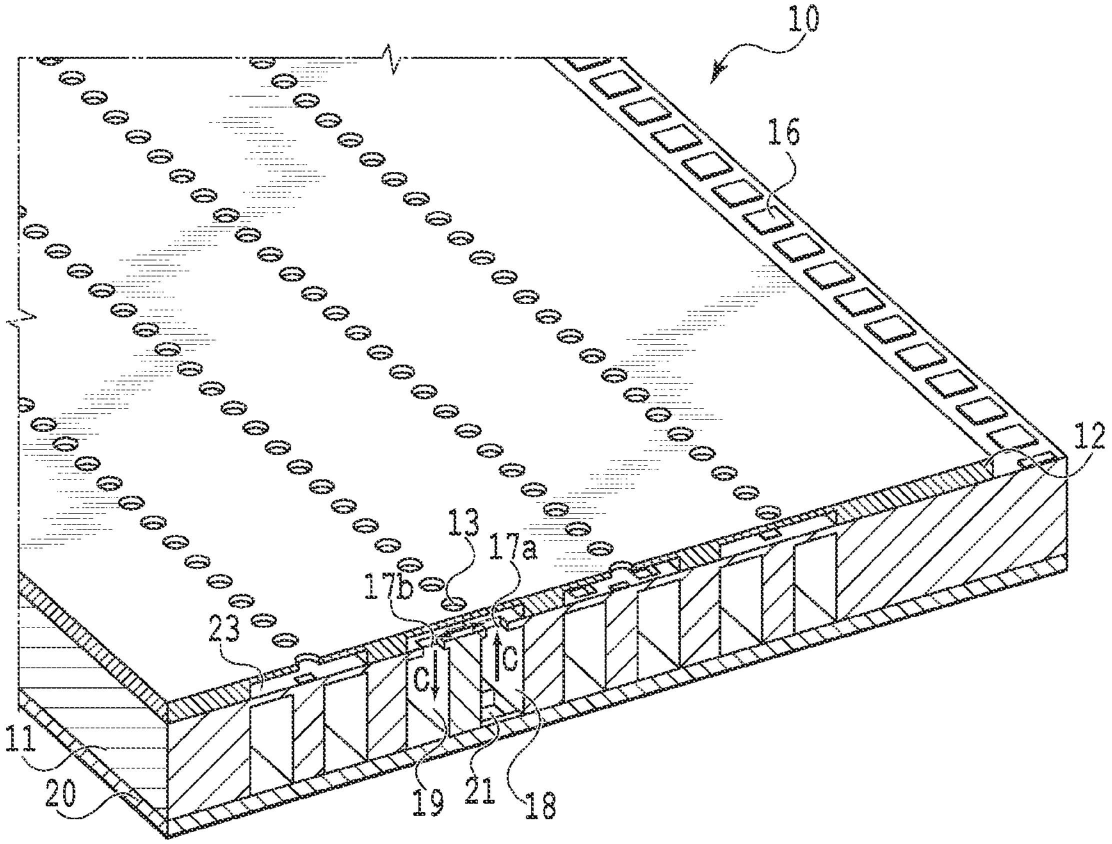
FIG. 10 is a perspective view illustrating a cross-section of the printing element substrate.

FIG. 10 is a perspective view illustrating a cross-section of the printing element substrate 10 and the cover plate 20 taken along a cross-section line X-X in FIG. 9A. In FIG. 10, four ejection port rows are illustrated on an ejection port formation member 12 of the printing element substrate 10; however, in the present embodiment, the number of the ejection port rows may be four or greater or four or smaller.

Here is described a flow of the liquid in the printing element substrate 10. The cover plate 20 has a function as a lid forming a part of walls of the liquid supply channel 18 and the liquid collection channel 19 formed on a substrate 11 of the printing element substrate 10. In the printing element substrate 10, the substrate 11 formed of Si and the like and the ejection port formation member 12 formed of a photosensitive resin are laminated to each other, and the cover plate 20 is bonded to a back surface of the substrate 11. The printing element 15 is formed on one surface side of the substrate 11 (see FIGS. 9A to 9C), and on a back surface side thereof, grooves forming the liquid supply channel 18 and the liquid collection channel 19 extending along the ejection port row are formed. As for the liquid supply channel 18 and the liquid collection channel 19 formed by the substrate 11 and the cover plate 20, the liquid supply channel 18 is connected with the common supply flow channel 211 in the flow channel member 210, and the liquid collection channel 19 is connected with the common collection flow channel 212 in the flow channel member 210. A differential pressure is generated between the liquid supply channel 18 and the liquid collection channel 19. Due to this differential pressure, the liquid in the liquid supply channel 18 provided in the substrate 11 flows to the liquid collection channel 19 through the supply port 17*a*, the pressure chamber 23, and the collection port 17*b* (an arrow C in FIG. 10). This flow can collect the thickened ink generated by evaporation from the ejection port 13, the bubble, the foreign substance, and so on into the liquid collection channel 19 in the ejection port 13 and the pressure chamber 23 in which no ejection operation is being performed. Additionally, it is possible to suppress the thickening of the ink and an increase in the density of color material in the ejection port 13 and the pressure chamber 23. As illustrated in FIGS. 7A and 7B, the liquid collected in the liquid collection channel 19 is collected in the order of the support member communication port 31 of the support member 30, the communication port 51 of the first flow channel member 50, and the common collection flow channel 212 through the opening 21 of the cover plate 20 and the support member communication port 31 of the support member 30. Thereafter, the liquid collected in the common collection flow channel 212 is collected to the collection path (FIG. 3) in the printing apparatus 1000.

Figure 11A:
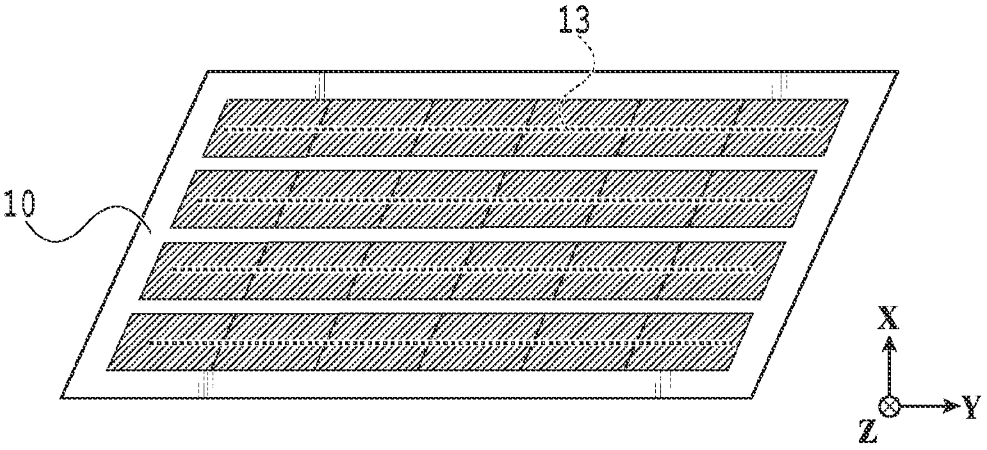
FIGS. 11A and 11B are schematic views of the printing element substrate partitioned into multiple areas for temperature adjustment.
Figure 11B:
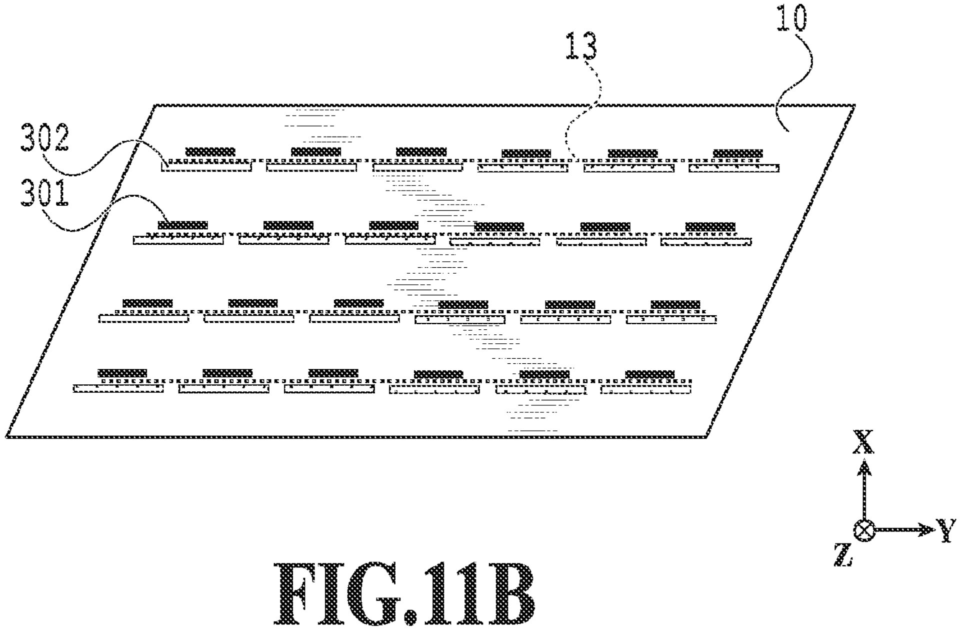

FIG. 11A schematically illustrates an appearance in which one printing element substrate 10 is partitioned into multiple areas for temperature adjustment. Additionally, as illustrated in FIG. 11B, a temperature sensor 301 and an individually controllable sub-heater 302 (a heating unit) are provided in each of the partitioned areas. The control unit 500 (see FIG. 2) performs the temperature adjustment based on the temperature set for each area by using the temperature sensor 301 and the sub-heater 302. Specifically, during printing, the control unit 500 drives the sub-heater 302 only in the area in which the temperature detected by the temperature sensor 301 is equal to or lower than a target temperature. With the target temperature of the printing element substrate 10 being set to a high temperature in some degree, it is possible to reduce the viscosity of the ink and to favorably perform the ejection operation and the circulation. Additionally, a temperature variation in the printing element substrate 10 and a temperature variation between multiple printing element substrates 10 are suppressed within a predetermined range by executing the above-described temperature control, and thus it is possible to reduce an ejection amount variation due to the temperature variation and to suppress uneven density on the printed image.

In light of the image quality, the target temperature of the printing element substrate 10 is preferably set to a temperature around equal to or higher than an equilibrium temperature of the printing element substrate 10 in a case where all the printing elements 15 are driven at the highest driving frequency that can be assumed. It is possible to apply a diode sensor, an aluminum sensor, or the like as the temperature sensor 301.

It is also possible to use the printing element 15 that is a heat generation element (a heating element) as the heating unit of the printing element substrate 10. Specifically, the printing element substrate 10 may be heated by applying a voltage that does not generate the bubbling to the printing element 15. As the heating unit according to the present embodiment, the printing element 15 may be employed instead of the sub-heater 302, or the sub-heater 302 and the printing element 15 may be used together.

<Problem to be Solved by Cover Plate According to Present Embodiment>

Here, the problem to be solved by the present embodiment is described in detail again. As described above, the temperature of the printing element substrate rises in a case of the ejection method using the heat generation element. In a case where the temperature of the printing element substrate rises excessively, the properties of the ink may be changed (deteriorated). On the other hand, in order to preserve the image quality, it is necessary to increase the above-described target temperature of the temperature control for the printing element substrate, and as a result, the problems of a change in the ink properties as described above and an increase in the density of the ink due to the evaporation from the ejection port occur. The increase in the ink density causes a problem such as a change in the density of the image and an ejection failure due to an increase in the viscosity. Periodical discharging of the ink can solve the problem of the increase in the density of the ink; however, this cases causes a new problem, such as a high running cost due to an increase in the amount of the ink used.

In order to deal with the excessive rise of the temperature of the printing element substrate, it is possible to reduce the temperature of the printing element substrate during the ejection by circulating the ink at a relatively low temperature in the printing element substrate. However, usually, since a flow channel near the pressure chamber that performs ejection is fine, and a flow resistance is high, it is necessary to generate a great differential pressure to obtain a sufficient cooling effect by the ink circulation. On the other hand, in general, the position of the ejection port surface of the pressure chamber is not kept in an ideal position unless the pressure is not within a predetermined negative pressure range, and it causes a bad effect on the ejection. Additionally, if the pressure chamber has a positive pressure, a meniscus of the ejection port surface is broken and the ink leaks to the outside at worst.

Accordingly, it is necessary to mount a differential pressure generation mechanism that can generate a great differential pressure while keeping the pressure chamber within the predetermined negative pressure range; however, in general, there is a tendency that, as the negative pressure is increased, the tolerance thereof is also increased, and there is a problem that the device becomes massive and expensive to perform ideal control. Additionally, if the ink circulation flow velocity in the pressure chamber is excessively increased as a result of generating a great differential pressure, there is a possibility of a bad effect on an ejection direction.

Moreover, since the ink flow rate passing through the entire printing head is increased, it is necessary to change pumps upstream and downstream of the head to that for a great flow rate or to arrange multiple pumps in parallel. However, in addition to the problem of an increase in the cost of the device, these may stimulate aggregation of particles such as colorant in the ink by increasing the pump output, and thus a new problem such as clogging occurrence and inhibition of the original function of the ink may be caused.

As a unit to solve the problems listed above, there is a configuration disclosed in Japanese Patent Laid-Open No. 2014-237323, that is, a configuration provided with another path that does not pass through the pressure chamber in the printing element substrate and has a relatively smaller flow resistance than that of the path passing through the pressure chamber. According to this configuration, it is possible to circulate more ink into the printing element substrate without increasing the differential pressure. However, this configuration has a problem as well.

In detail, it is a problem that, as a result of providing the other path, and the ink flow rate passing through the inside of the printing element substrate is increased, and thus a pressure loss occurs, a pressure variation occurs between the pressure chambers, the ejection state varies, and image unevenness is caused. Particularly, in the configuration like Japanese Patent Laid-Open No. 2014-237323 in which an opening is provided at an end portion of a relatively fine flow channel, the problem of the pressure variation is noticeable since the flow resistance is great once the flow rate of the fine flow channel is increased, and also a flow channel length is long.

<Cover Plate Including Bypass>

An object of the present embodiment is to solve the above-described problem. Hereinafter, the present embodiment is described in detail with reference to FIGS. 12A to 12C and FIGS. 13A and 13B. Each of FIGS. 12A to 12C exemplifies the cover plate according to the present embodiment. Additionally, FIGS. 13A and 13B are diagrams describing an ink flow according to the present embodiment and illustrate a structure of one of the ejection port rows and a flow channel portion (a portion in which the ink flows) connected to the one row.

Figure 12A:
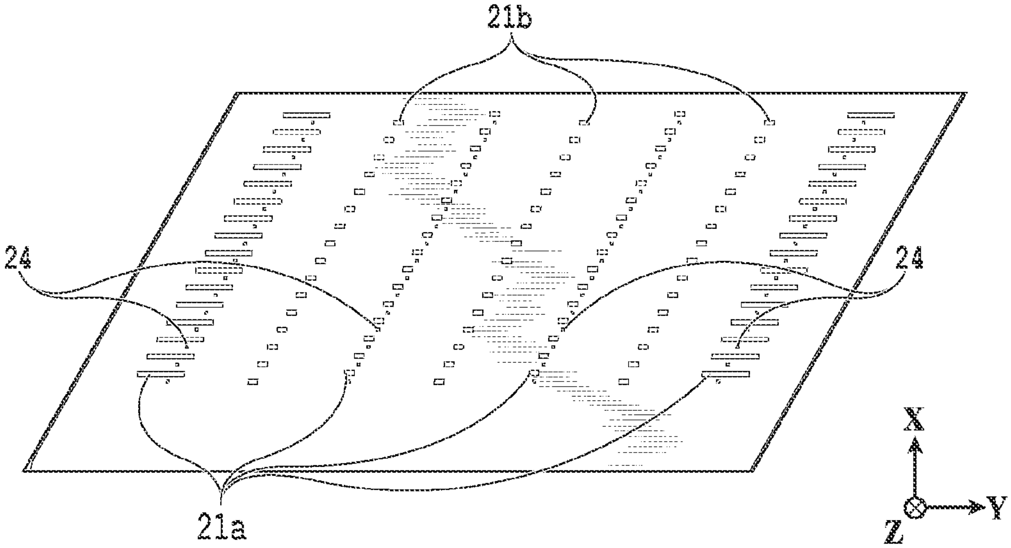
FIGS. 12A to 12C are top views of a cover plate according to a first embodiment.
Figure 13A:
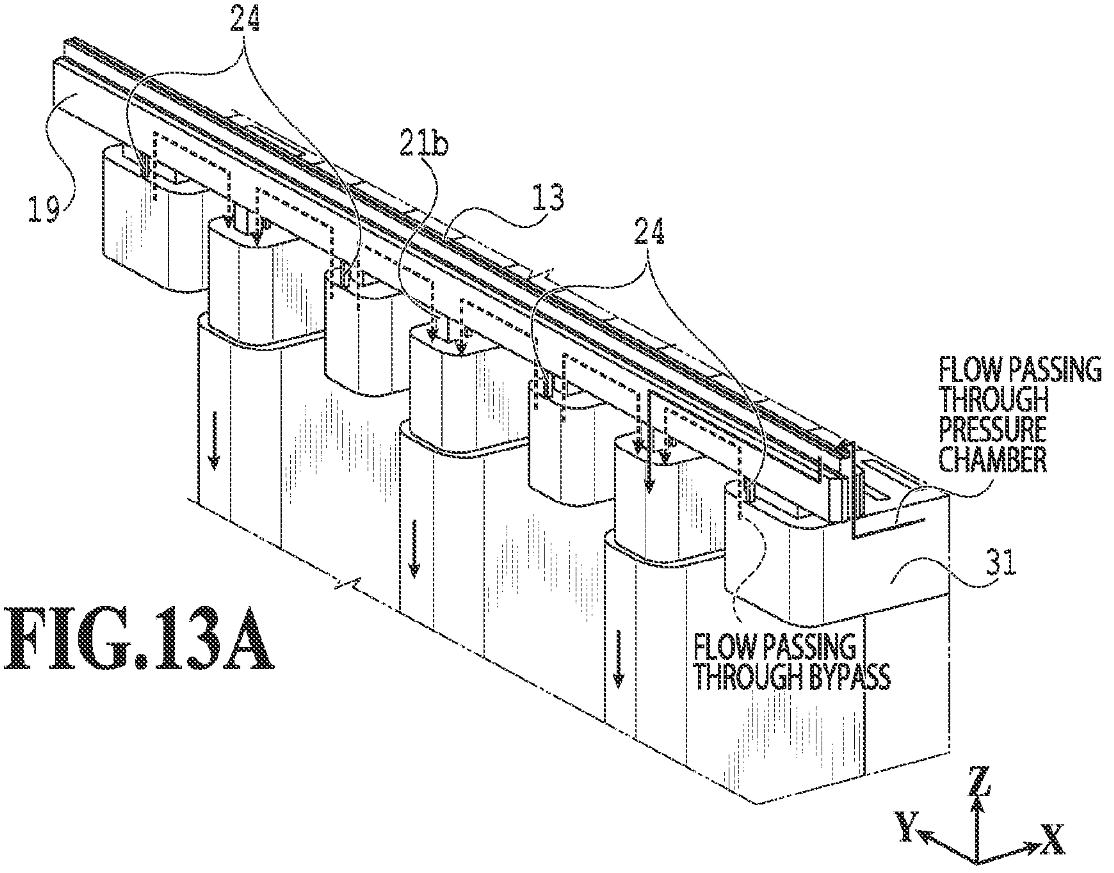
FIGS. 13A and 13B are perspective views of a flow channel portion.
Figure 13B:
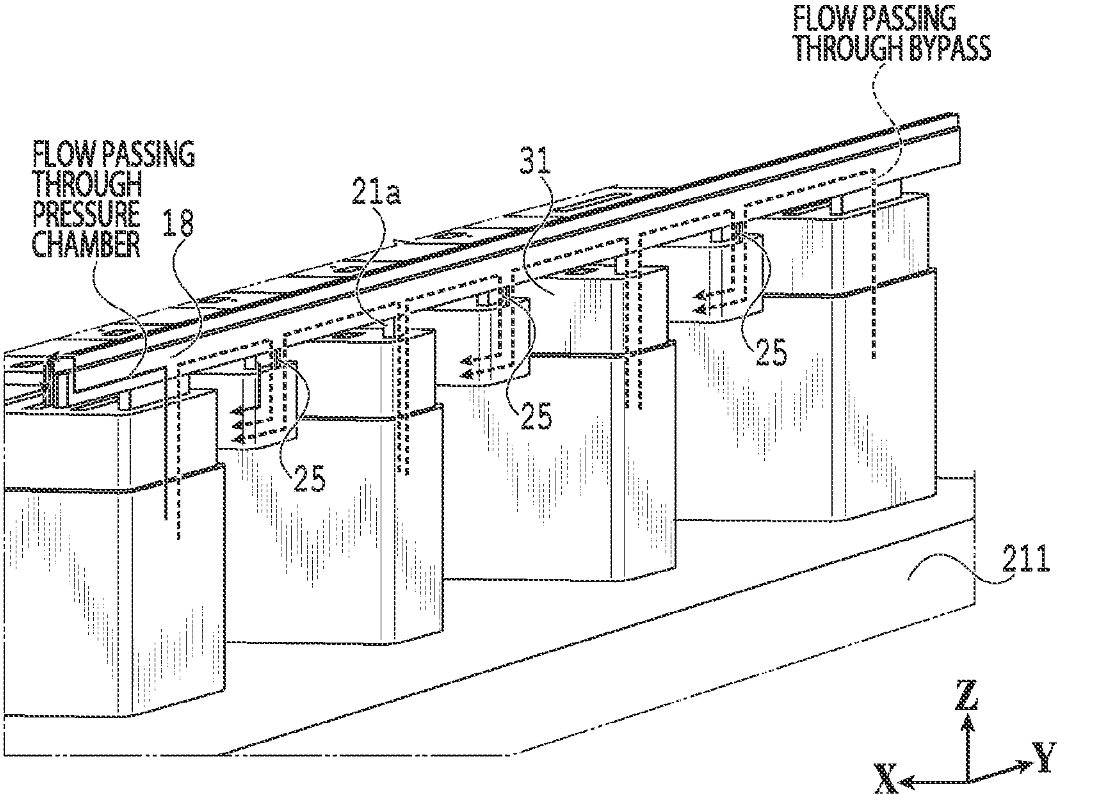

FIG. 12A illustrates a flow-in bypass opening 24 in addition to the cover plate supply opening 21*a* and the cover plate collection opening 21*b*. As illustrated in FIG. 13A, the flow-in bypass opening 24 allows the ink that passes through the communication port 51 (not illustrated) and the support member communication port 31 from the common supply flow channel 211 (not illustrated) to flow into the liquid collection channel 19 in the printing element substrate. This ink does not pass through the pressure chamber 23 but passes through the cover plate collection opening 21*b*, the support member communication port 31, and the communication port 51 to be discharged to the common collection flow channel 212.

Figure 12B:
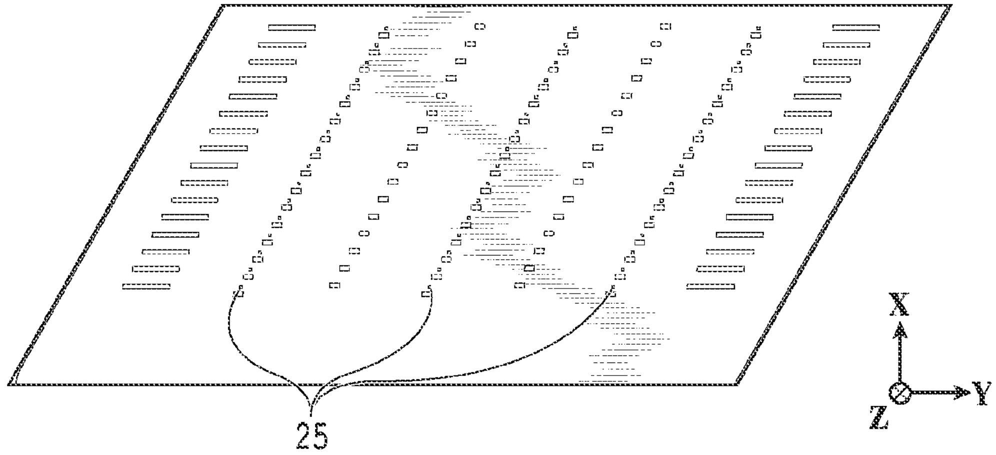

FIG. 12B illustrates a discharge bypass opening 25 in addition to the cover plate supply opening 21*a* and the cover plate collection opening 21*b*. The discharge bypass opening 25 allows the ink that passes through the liquid supply channel 18 by way of the communication port 51, the support member communication port 31, and the cover plate supply opening 21*a* from the common supply flow channel 211 to be discharged to the common collection flow channel 212 through the support member communication port 31 and the communication port 51 (see FIG. 13B). This ink does not pass through the pressure chamber 23.

Figure 12C:
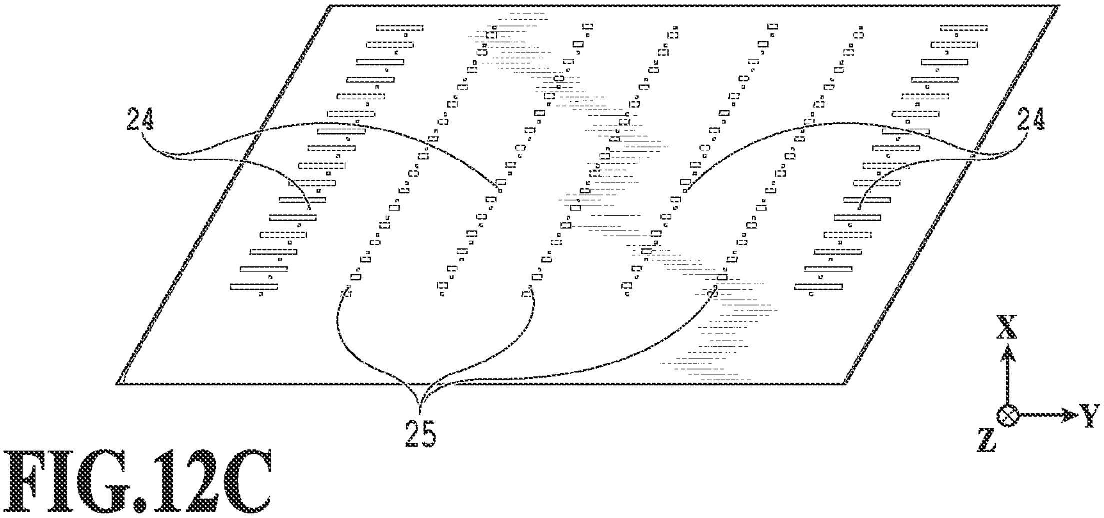

FIG. 12C illustrates the cover plate including both the above-described flow-in bypass opening 24 and discharge bypass opening 25.

With the employment of the structure of the bypass flow channel as exemplified in FIGS. 12A to 12C, it is possible to flow a large amount of the ink into the printing element substrate without passing through the flow channel around the pressure chamber having the highest flow resistance, and thus it is possible to sufficiently perform the temperature control function. Additionally, with the multiple bypasses being provided for each ejection port row, a distance between the flow-in bypass opening 24 and the cover plate collection opening 21*b* (see FIG. 13A) is short, and a distance between the cover plate supply opening 21*a* and the discharge bypass opening 25 is short (FIG. 13B). Therefore, it is possible to shorten the flow path of the ink flowing in the liquid supply channel 18 of the printing element substrate and the flow path of the ink flowing in the liquid collection channel 19. This makes it possible to reduce the pressure loss in the liquid supply flow channel and the liquid collection flow channel having a relatively high flow resistance and to reduce the pressure variation in the ejection port row direction.

Moreover, with the multiple bypasses being provided for each ejection port row as described above, flow-in portions in the ejection port row, into which the ink flows at a relatively low temperature, are scattered, and additionally, discharge portions in the ejection port row, from which the ink at a temperature increased to be relatively high in the printing element substrate is discharged, are scattered. Therefore, it is possible to also reduce a temperature variation in a direction of a rear ejection row, and it is possible to implement a high image quality in terms of both pressure and temperature.

The flow-in bypass opening 24 arranged to be the closest to one end side of the liquid supply channel 18 (for example, on the left side in each of FIGS. 12A to 12C) is arranged on the one end side (the left side) of the discharge bypass opening 25 arranged to be the closest to the one end side (the left side) of the liquid collection channel 19. That is, as for the flow-in bypass opening 24 arranged on the leftmost side out of the multiple flow-in bypass openings 24 and the discharge bypass opening 25 arranged on the leftmost side out of the multiple discharge bypass openings 25, the flow-in bypass opening 24 is arranged on the left side (an outer side) of the discharge bypass opening 25.

Additionally, the flow-in bypass opening 24 arranged to be the closest to one end side of the liquid supply channel 18 (for example, on the right side in each of FIGS. 12A to 12C) is arranged on the one end side (the right side) of the discharge bypass opening 25 arranged to be the closest to the one end side (the right side) of the liquid collection channel 19. That is, as for the flow-in bypass opening 24 arranged on the rightmost side out of the multiple flow-in bypass openings 24 and the discharge bypass opening 25 arranged on the rightmost side out of the multiple discharge bypass openings 25, the flow-in bypass opening 24 is arranged on the right side (an outer side) of the discharge bypass opening 25. Note that, in the present embodiment, as illustrated in FIGS. 12A to 12C and FIGS. 13A and 13B, the four flow-in bypass openings 24 and the three discharge bypass openings 25 are provided for each ejection port row; however, the number of the bypasses is not limited thereto. Also, in the present embodiment, a plurality of the flow-in bypass openings are formed for each supply collection flow channel, and a plurality of the discharge bypass openings are formed for each supply flow channel.

It is preferable for each flow path length of the liquid supply flow channel and the liquid collection flow channel to have a distance between the cover plate supply opening 21*a* and the cover plate collection opening 21*b* on an end portion side of the ejection port row that is longer than a distance between the cover plate supply opening 21*a* and the cover plate collection opening 21*b* on a central side. In this case, there is a characteristic that the temperature is likely to rise on an end portion side of the ejection port. Accordingly, taking into consideration this characteristic, as illustrated in FIGS. 12A to 12C, a configuration in which the cover plate supply opening 21*a* and the flow-in bypass opening 24 are arranged on the end portion side of the ejection port row is preferable to supply the ink at a relatively low temperature to the end portion. Note that the present embodiment is not limited to this configuration.

Additionally, as illustrated in FIGS. 12A to 12C, the size of the cover plate supply opening 21*a* on the end portion side of the ejection port row (specifically, the length of the ejection port row in an elongation direction) is greater than the other cover plate supply opening and cover plate collection opening. Thus, there is a merit that it is possible to stimulate the ink supply to the end portion and to suppress the temperature rise at the end portion. However, this configuration requirement related to the size is not essential for the present embodiment; therefore, the size of the cover plate supply opening on the end portion side is not necessarily great. Even if the size of the cover plate supply opening at the end portion is equal to or smaller than the other cover plate supply opening, it is still possible to achieve the effect of the present embodiment.

As for each flow channel width of the above-described liquid supply flow channel and liquid collection flow channel, as the flow channel width is greater, the flow channel resistance is smaller, and thus it is advantageous in terms of the pressure variation. However, on the other hand, since the reduction in the width or area of the printing element substrate contributes to the cost reduction, there is also a demand to reduce the flow channel width in terms of the cost. Therefore, with the multiple bypasses being arranged in the ejection port row direction like the present embodiment, it is possible to reduce the width of the printing element substrate while suppressing the pressure variation. Specifically, even in a case of the liquid supply flow channel and the liquid collection flow channel of a narrow and small width of 200 μm or smaller, it is possible to use the printing head with no problem in pressure.

It is further advantageous for each of a Y direction distance between the flow-in bypass opening 24 and the cover plate collection opening 21*b* and a Y direction distance between the cover plate supply opening 21*a* and the discharge bypass opening 25 to be short. Accordingly, in order to prevent a locally long portion, it is desirable to design the distances between the cover plate opening and the bypass opening to be substantially the same.

It is desirable to suppress at least one of a pressure difference in the distance between the flow-in bypass opening 24 and the cover plate collection opening 21*b* and a pressure difference in the distance between the cover plate supply opening 21*a* and the discharge bypass opening 25 to substantially 70 mmAq or smaller. This is to suppress an ink droplet volume variation due to a pressure variation in the antiphase of a temperature variation to around 2% or smaller, substantially, based on the fact that an ink droplet volume variation due to a temperature variation that occurs between the cover plate opening and the bypass opening described above is around about 2%. Therefore, it is possible to compensate the pressure variation. Note that, "in the antiphase" indicates a predetermined phenomenon. To be specific, since the ink at a relatively low temperature flows into the vicinity of the cover plate supply opening 21*a* and the flow-in bypass opening 24, and the temperature is low with high viscosity, the volume of the ejected ink droplet is small. However, since the pressure is relatively high, a meniscus surface of the ejection port surface projects to the ejection direction side, and it is indicated that the volume of the ejected ink droplet is increased consequently.

In order to implement the structure described above, it is desirable for the flow-in bypass and the discharge bypass to be, for example, a circular tube of a diameter of substantially 0.11 mm or smaller or a tube having a flow resistance per pipeline length that is equal to that of the circular tube. Such a tube may be, for example, a rectangular tube of a width of substantially 0.1 mm or smaller; however, the cross-section shape may be any shape including a circle and a rectangle. Additionally, here is considered a case of implementing a supply flow rate of 600 ml/min or smaller, which corresponds to a versatile pump flow rate, in the printing head in which the 17 printing element substrates illustrated in the present embodiment are arrayed (see FIGS. 6A to 6D). In this case, while a cover plate thickness is 0.3 mm, it is desirable to apply a bypass flow channel such as a circular tube of a diameter of substantially 0.08 mm or smaller, or a tube (regardless of the cross-section shape) of a flow resistance per pipeline length is equal to or greater than that of the circular tube of a diameter of substantially 0.08 mm. Additionally, in other words, it is desirable for a combined resistance of the path passing through the flow-in bypass or the discharge bypass but not passing through the pressure chamber to be ⅕ or greater of a combined resistance of the path from an inlet of the liquid supply channel 18 to an outlet of the liquid collection channel 19 in the printing element substrate in a case of passing through the pressure chamber. Here, in a case where the flow resistances of the parallel flow channels are substantially the same, the combined resistance indicates a flow resistance of one path/paralleled number. Note that, although the value of the combined resistance is varied depending on the viscosity of the ink used, the shape of the pressure chamber, the number of the pressure chambers, and the like, it is possible to calculate the value of the combined resistance by using logical calculation of the flow resistance of the pipeline and fluid simulation.

Incidentally, as for description of the configuration of the printing head described in the present embodiment, there are 512 nozzles per row, 16 rows in each printing element substrate, and the 17 printing element substrates are arranged in the printing head. The combined resistance of the path passing through the pressure chamber in this case is substantially 2 mmAq/(ml/min)/mPa·s. Accordingly, a desirable combined resistance of the bypass flow channel is substantially 0.4 mmAq/(ml/min)/mPa·s or greater.

It is important to accurately form the bypass opening with a small tolerance. If the bypass opening dimension tolerance is great, various problems occur. For example, there occurs a problem that a flow rate tolerance passing through the printing head is increased, and thus a pump and the like for a great flow rate corresponding to the maximum flow rate in a case where the tolerance occurs need to be prepared. Additionally, there may also occur a problem that the power required for control to maintain the inside of the printing element substrate at the target temperature is increased, and thus a high-capacity power source needs to be mounted. In order to accurately form the bypass opening, it is desirable to use the photolithography and the like on a member of silicon, a photosensitive resin, or the like to form the opening so as to be deep in a thickness direction of the cover plate (to penetrate the cover plate) as illustrated in FIGS. 12A to 12C and FIGS. 13A and 13B. It is also possible to consider a bypass structure in which a flow channel direction is a surface direction of the cover plate; however, in this case, in addition to a processing tolerance of the flow channel portion, an adhesive thickness tolerance between members is added, and the flow rate tolerance of the bypass portion is increased. Accordingly, this cannot be said to be a desirable structure. In terms of this manufacturing process, it is difficult to open an opening that is excessively fine. Therefore, as for the cross-section area of the opening shape of each bypass opening of the flow-in bypass and the discharge bypass, it is desirable for a circular shape to have a diameter of substantially 0.04 mm or greater, or it is desirable for a shape other than the circular shape to have a cross-section area shape (any shape except circle) corresponding to the circular shape of a diameter of substantially 0.04 mm or greater.

Any shape may be applied to the cross-section shape of the bypass flow channel as long as it is possible to implement a desired flow resistance; however, in terms of strength, a shape such as a circle without a corner, an oval, or a shape of a rectangular tube with a chamfered corner is desirable. As described above, in order to preserve the opening accuracy of the cover plate to which the bypass is provided, manufacturing with silicon to which a technique such as the photolithography can be applied is desirable. This is because, since silicon is a brittle material, there is a concern of a breakage due to stress concentration at a corner in a case of applying heat.

Particularly, the present embodiment is also preferable for a so-called in-line joint head in which the printing element substrates are joined with each other and arranged over a printing width. Since both the bypass and cover plate opening are arranged on an inner side of the endmost portion of the ejection port row, it is possible to arrange the printing element substrates to be in-line without making a clearance therebetween.

Second Embodiment

<Variation of Flow Channel Structure>

Figure 14A:
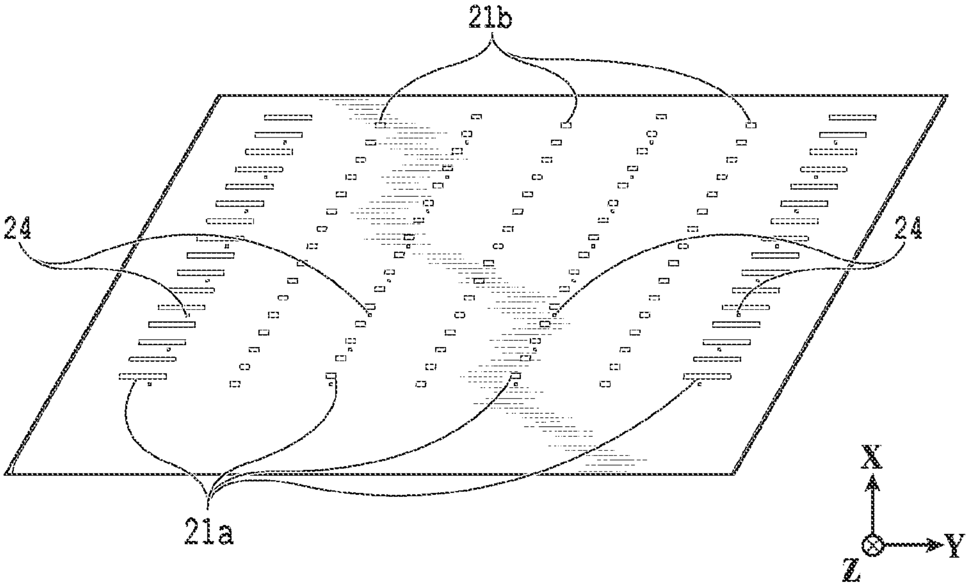
FIGS. 14A and 14B are top views of the cover plate according to a second embodiment.
Figure 14B:
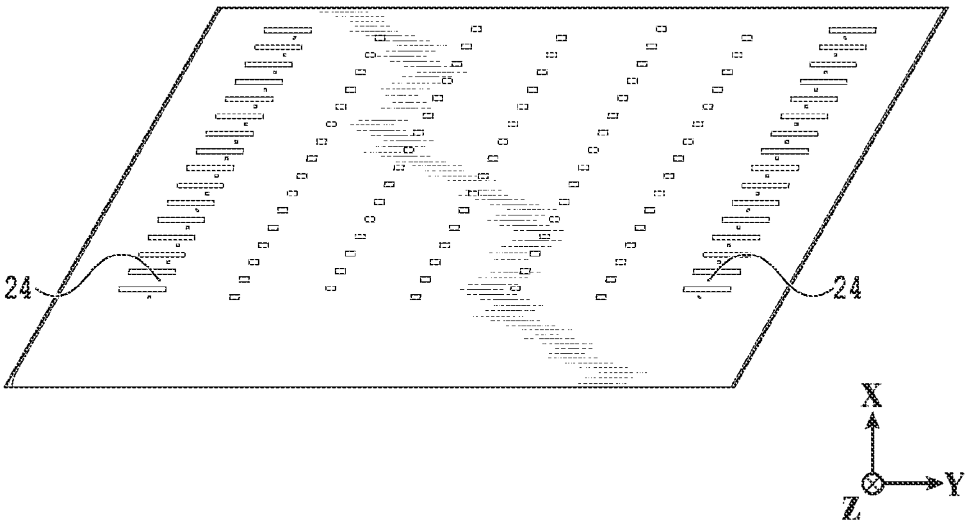

Each of FIGS. 14A and 14B exemplifies the cover plate according to the present embodiment. In FIG. 14A, only one row of the flow-in bypass openings 24 is provided for two ejection port rows. Note that, it is not limited to the one row of the flow-in bypass openings for every two rows, and one row of the flow-in bypass openings may be provided for every three or more rows. Additionally, as illustrated in FIG. 14B, there is also a structure in which some of the bypass openings are not formed in the ejection port row. In this structure, comparing with the structure in FIG. 14A, although there is a portion that cannot be cooled enough in the printing element substrate, there is a merit that the pressure distribution is even between the ejection port rows since the bypass openings are arranged similarly in each ejection port row.

Note that, although FIGS. 14A and 14B each exemplify arrangement from which the flow-in bypass openings 24 are thinned, arrangement from which the discharge bypass openings 25 are thinned similarly may be applicable. Alternatively, a structure from which the bypass openings are thinned from a structure including both the flow-in bypasses and discharge bypasses (FIG. 12C) may be applicable. Alternatively, as the thinning of the bypass openings, a method that is a combination of the thinning in FIG. 14A and the thinning in FIG. 14B may be employed.

As illustrated in FIGS. 14A and 14B, a reduction in the number of the bypass openings has a merit that the bypass opening size can be great. As illustrated in FIGS. 12A to 12C and FIGS. 14A and 14B, the bypass opening size is significantly smaller than the cover plate supply opening; therefore, in the formation of the bypass opening, providing openings of greatly different opening sizes in the same plate requires an accurate manufacturing process, and it is difficult. To deal with this, with a small number of large size bypass openings being provided like the present embodiment, it is possible to improve the productivity in terms of the manufacturing process more than the first embodiment.

Additionally, it has not been described about widths of the liquid supply channel 18 and the liquid collection channel 19 in the printing element substrate. In a case where the bypass opening is provided, flow rates in these flow channels are increased, and pressure drops are increased. Accordingly, it is desirable for the liquid supply channel 18 and the liquid collection channel 19 connected with the bypass opening to have a wider width than another flow channel (that is not connected with the bypass opening).

Other Embodiments

The above-described embodiments exemplify a head that ejects one color of ink from one head (FIG. 3 and the like); however, it is also possible to apply a technical idea of the present disclosure to a multicolor head that ejects multiple colors of inks from one head. Additionally, the head to which the technical idea of the present disclosure is applicable is not limited to a line head. Specifically, it is also possible to apply the technical idea of the present disclosure to a so-called serial head that performs a reciprocated operation on a printing medium.

It is possible to favorably apply the technical idea of the present disclosure to an ink jet printing head that is a head in which no bypass is provided, and the temperature of the printing element substrate rises around 5° C. or more than the ink temperature flowing into the printing element substrate in a case where printing is performed at the maximum ink ejection amount.

Additionally, although the foregoing embodiments are described under the assumption that a so-called thermal head that heats the ink to eject the ink is used, it is also possible to apply the technical idea of the present disclosure to a printing head using a piezo element. This is because, since a driving waveform generation circuit (IC) arranged to provide the piezo element with a driving waveform generates heat also in the printing head using the piezo element, an event similar to that of the above-described thermal head occurs in a case, for example, the IC is arranged near the printing element substrate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to suppress a temperature variation in a liquid ejection head including a printing element substrate by suppressing a pressure variation between pressure chambers and to prevent a temperature rise in a liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-039661, filed Mar. 14, 2023, which is hereby incorporated by reference herein in its entirety.

What is claimed is:

1. A liquid ejection head, comprising:

a printing element substrate comprising:

an ejection port row in which a plurality of ejection ports are arrayed in an arrayment direction;

a plurality of pressure chambers communicating with the plurality of ejection ports, respectively;

a plurality of printing elements provided in the plurality of pressure chambers, respectively;

a liquid supply channel extending in the arrayment direction and supplying a liquid to the plurality of pressure chambers; and a liquid collection channel extending in the arrayment direction and collecting the liquid from the plurality of pressure chambers;

a supply communication port supplying the liquid to the printing element substrate via a supply opening;

a collection communication port collecting the liquid from the printing element substrate via a collection opening; and at least either of two or more flow-in bypasses and two or more discharge bypasses as flow channels that do not pass through the pressure chambers, wherein the two or more flow-in bypasses connect a plurality of flow-in bypass openings with the collection opening;

the two or more discharge bypasses connect a plurality of discharge bypass openings with the supply opening; and each flow-in bypass opening is positioned between the supply communication port and the liquid collection channel in a positional relation along a route through which the liquid is supplied and is an opening supplying the liquid to the liquid collection channel, and each discharge bypass opening is positioned between the liquid supply channel and the collection communication port and is an opening collecting the liquid from the liquid supply channel.

2. The liquid ejection head according to claim 1, wherein the supply communication port and the collection communication port are formed in a support member that supports the printing element substrate directly or indirectly.

3. The liquid ejection head according to claim 2, wherein the number of supply communication ports connected to each liquid supply channel is two or more, and the number of collection communication ports connected to each liquid collection channel is two or more.

4. The liquid ejection head according to claim 2, wherein the discharge bypass openings and the flow-in bypass openings are formed in a lamination direction of the printing element substrate and the support member by photolithography.

5. The liquid ejection head according to claim 2, wherein a cover plate is provided between the printing element substrate and the support member, and the supply opening and the collection are provided in the cover plate, and at least either of the plurality of discharge bypass openings and the plurality of flow-in bypass openings is formed in the cover plate.

6. The liquid ejection head according to claim 5, wherein the cover plate is formed of a photosensitive resin or silicon, and the supply opening, the collection opening, the discharge bypass openings, and the flow-in bypass openings are formed by photolithography on the cover plate.

7. The liquid ejection head according to claim 6, wherein the discharge bypass openings and the flow-in bypass openings are each formed in a thickness direction of the cover plate and penetrate the cover plate.

8. The liquid ejection head according to claim 2, wherein in the arrayment direction, one of the plurality of flow-in bypass openings is arranged on an end portion side of the plurality of discharge bypass openings.

9. The liquid ejection head according to claim 5, wherein a pressure difference between the flow-in bypass openings and the collection openings is 70 mmAq or lower.

10. The liquid ejection head according to claim 5, wherein a pressure difference between the supply opening and the discharge bypass openings is 70 mmAq or lower.

11. The liquid ejection head according to claim 5, wherein a pressure difference between the flow-in bypass openings and the collection opening is 70 mmAq or lower, and a pressure difference between the supply opening and the discharge bypass openings is 70 mmAq or lower.

12. The liquid ejection head according to claim 2, wherein each of the flow-in bypasses and the discharge bypasses is a circular tube of a diameter of 0.11 mm or less or a tube having a flow resistance per pipeline length equal to that of the circular tube.

13. The liquid ejection head according to claim 2, wherein each of a flow resistance per pipeline length of the flow-in bypasses and a flow resistance per pipeline length of the discharge bypasses is equal to or greater than a flow resistance per pipeline length of a circular tube of a diameter of 0.08 mm.

14. The liquid ejection head according to claim 2, wherein each of a cross-section area of an opening shape of the flow-in bypass openings and a cross-section area of an opening shape of the discharge bypass openings is equal to or greater than a cross-section area of a circular tube of a diameter of 0.04 mm.

15. The liquid ejection head according to claim 2, wherein a combined resistance of a path passing through the flow-in bypasses or the discharge bypasses but not passing through the pressure chambers is ⅕ or greater of a combined resistance of a path from an inlet of the liquid supply channel to an outlet of the liquid collection channel in a case of passing through the pressure chambers.

16. The liquid ejection head according to claim 2, wherein each printing element is a heating element.

17. The liquid ejection head according to claim 2, wherein the printing element substrate includes a temperature sensor and a heating unit, and temperature control during printing is executed by using the temperature sensor and the heating unit.

18. The liquid ejection head according to claim 2, wherein each printing element is a piezoelectric element, and an integrated circuit that provides a waveform to the piezoelectric element and the printing element substrate are thermally connected with each other.

19. The liquid ejection head according to claim 1, wherein the liquid ejection head comprises two or more of the flow-in bypasses and two or more of the discharge bypasses.

* * * * *